United States Patent
Rakib et al.

(10) Patent No.: US 12,335,081 B2
(45) Date of Patent: Jun. 17, 2025

(54) ULTRA WIDE BAND SIGNALS USING ORTHOGONAL TIME FREQUENCY SPACE MODULATION

(71) Applicant: Cohere Technologies, Inc., San Jose, CA (US)

(72) Inventors: Shlomo Selim Rakib, San Jose, CA (US); Ronny Hadani, San Jose, CA (US); Shachar Kons, San Jose, CA (US); Clayton Ambrose, San Jose, CA (US)

(73) Assignee: Cohere Technologies, Inc., San Jose, CA (US)

( * ) Notice: Subject to any disclaimer, the term of this patent is extended or adjusted under 35 U.S.C. 154(b) by 59 days.

(21) Appl. No.: 18/555,391

(22) PCT Filed: Apr. 29, 2022

(86) PCT No.: PCT/US2022/072002
§ 371 (c)(1),
(2) Date: Oct. 13, 2023

(87) PCT Pub. No.: WO2022/232830
PCT Pub. Date: Nov. 3, 2022

(65) Prior Publication Data
US 2024/0205065 A1    Jun. 20, 2024

Related U.S. Application Data

(60) Provisional application No. 63/181,828, filed on Apr. 29, 2021.

(51) Int. Cl.
*H04L 27/26* (2006.01)
*H04L 27/10* (2006.01)

(52) U.S. Cl.
CPC ........ *H04L 27/2639* (2013.01); *H04L 27/103* (2013.01); *H04L 27/2628* (2013.01)

(58) Field of Classification Search
CPC ............... H04L 27/2639; H04L 27/103; H04L 27/2628; H04L 27/26532; H04B 1/707;
(Continued)

(56) References Cited

U.S. PATENT DOCUMENTS

| | | |
|---|---|---|
| 4,754,493 A | 6/1988 | Coates |
| 5,083,135 A | 1/1992 | Nagy et al. |

(Continued)

FOREIGN PATENT DOCUMENTS

| | | |
|---|---|---|
| WO | 2011150315 | 12/2011 |
| WO | 2013148546 | 10/2013 |

(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.
(Continued)

*Primary Examiner* — David S Huang
(74) *Attorney, Agent, or Firm* — Perkins Coie LLP

(57) ABSTRACT

Methods, systems and devices for wireless communication are described. One example method includes mapping information bits to transmission resources in a two-dimensional delay-Doppler grid In this example, the two-dimensional delay-Doppler grid includes N Doppler elements along a Doppler dimension and M delay elements along a delay dimension, and N and M are positive integers. The example method continues with converting a result of the mapping to a signal waveform, and generating an orthogonal time frequency space (OTFS) waveform by spreading the signal waveform using a spreading scheme. In some examples, the
(Continued)

signal waveform includes an ultra-wide band (UWB) waveform.

21 Claims, 29 Drawing Sheets

(58) Field of Classification Search
CPC ............ H04B 1/713; H04B 2001/6912; H04B 1/7163
See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0263752 A1 | 11/2007 | Guey et al. |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |

(56) References Cited

U.S. PATENT DOCUMENTS

| | | |
|---|---|---|
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0219712 A1 | 8/2018 | Terry |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0111842 A1 | 4/2021 | Pfadler |
| 2021/0126750 A1 | 4/2021 | Kons et al. |
| 2021/0135905 A1 | 5/2021 | Kons et al. |
| 2021/0194732 A1 | 6/2021 | Kons et al. |
| 2022/0182265 A1* | 6/2022 | Xu .................. H04L 27/26532 |

FOREIGN PATENT DOCUMENTS

| | | |
|---|---|---|
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017/049303 | 3/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |

(56) References Cited

FOREIGN PATENT DOCUMENTS

| WO | 2020227619 | 11/2020 |
|----|------------|---------|
| WO | 2020247768 | 12/2020 |
| WO | 2021026212 | 2/2021 |
| WO | 2021062354 | 4/2021 |

OTHER PUBLICATIONS

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Extended European Search Report for 22796989.6, dated Sep. 30, 2024 11 pages.
Monk et al. "OTFS—Orthogonal Time Frequency Space A Novel Modulation Technique meeting 5G High Mobility and Massive MIMO Challenges" Aug. 1, 2016 13 pages.
International Search Report and Written Opinion for PCT/US2022/072002, dated Sep. 13, 2022, 12 pages.

\* cited by examiner

ULTRA WIDE BAND SIGNALS USING ORTHOGONAL TIME FREQUENCY SPACE MODULATION

CROSS-REFERENCE TO RELATED APPLICATION(S)

This application is a 371 of International Patent Application No. WO2022/232830, filed Apr. 29, 2022, which claims priority to U.S. Provisional Application No. 63/181,828, filed on Apr. 29, 2021, titled "ULTRA WIDE BAND SIGNALS USING ORTHOGONAL TIME FREQUENCY SPACE MODULATION," the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be used by wireless networks to achieve several operational improvements.

In one example aspect, a wireless communication method is disclosed. The method includes mapping information bits to transmission resources in a two-dimensional delay-Doppler grid, wherein the two-dimensional delay-Doppler grid comprises N Doppler elements along a Doppler dimension and M delay elements along a delay dimension, where N and M are positive integers; converting a result of the mapping to a signal waveform; and generating an orthogonal time frequency space (OTFS) waveform by spreading the signal waveform using a spreading scheme.

In another example aspect, another wireless communication method is disclosed. The method includes determining an estimate of a signal waveform received at a receiver by de-spreading an orthogonal time frequency space (OTFS) waveform using a de-spreading scheme; obtaining a two-dimensional delay-Doppler grid representation from the signal waveform; and extracting information bits from the two-dimensional delay-Doppler grid representation.

In another example aspect, a wireless communication apparatus that implements the above-described methods is disclosed.

In yet another example aspect, a wireless system in which one or more of the above described methods are implemented is disclosed.

In yet another example aspect, the method may be embodied as processor-executable code and may be stored on a computer-readable program medium.

In yet another aspect, a wireless communication system that operates by providing a single pilot tone for channel estimation is disclosed.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

Figure 1A:
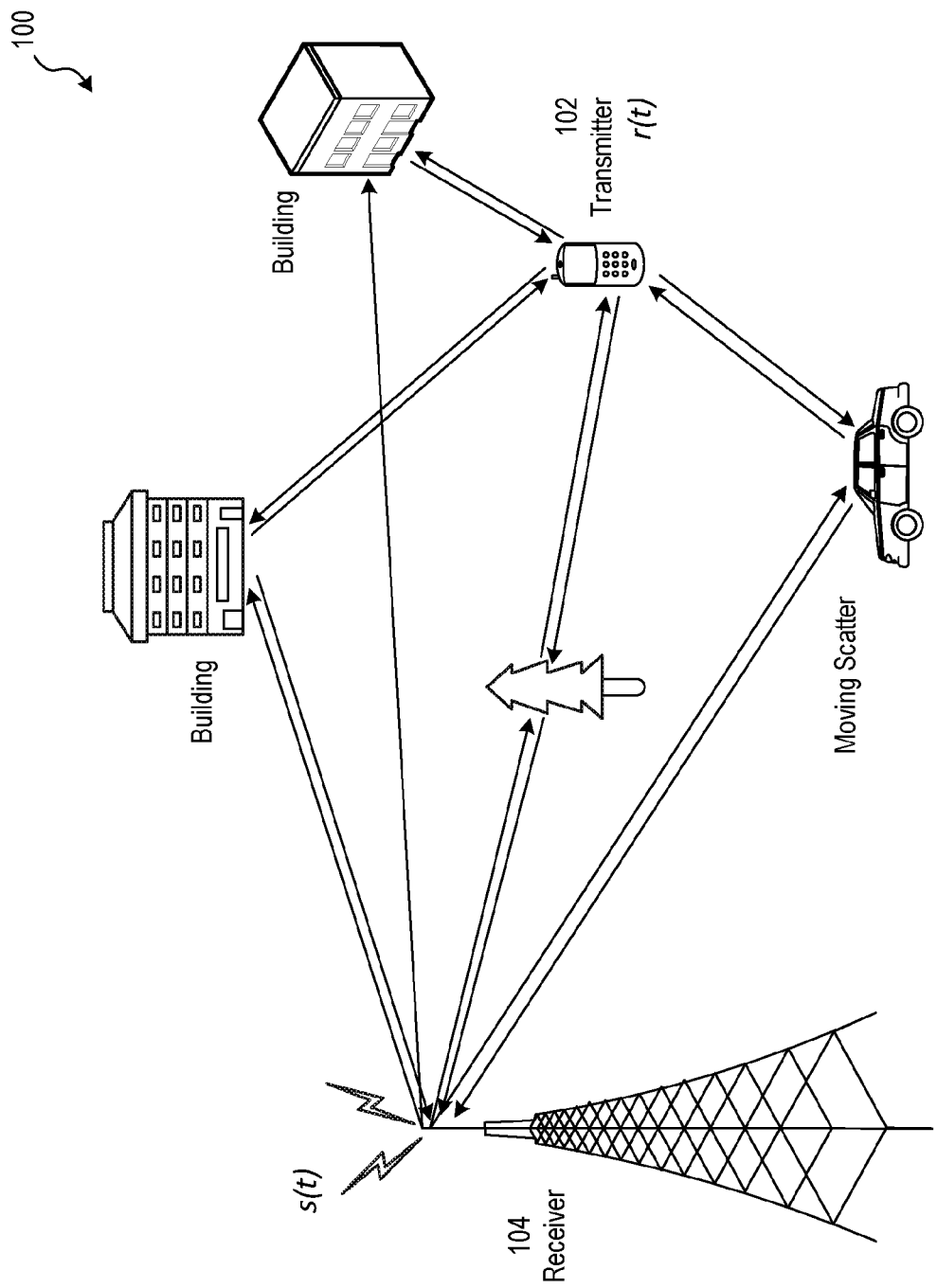
FIG. 1A shows an example communication network.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, certain standard-specific terms are used for illustrative purpose only, and the disclosed techniques are applicable to any wireless communication systems.

1. Introduction—Wireless Communication Environment

The wireless or time-variant nature of the communication channel poses several challenges in design a transmission protocol suitable for wireless communication scenarios. These days, users expect their wireless devices to work everywhere and in a variety of mobile or stationary situations.

The relative movement of transmitters and receivers with respect to each other cause signal distortions such as varying channel delay, Doppler and/or angular spread, signal degradation due to ground clutter, sea clutter, and so on. Another example of signal degradation is flat fading in which an entire channel occupied by a transmission signal experiences fading or attenuation that may be relatively constant across the channel. In practice, a transmission scheme may need to be designed to fit within a certain link budget, maximum power constraint, or linearity of electronics used for transmitting or receiving signals.

Furthermore, a communications system may perform transmissions between a transmitter and one or more receivers using various configurations such as ad-hoc (any device to any device), or multi-user (one device to many devices). Recently, a technique called orthogonal time frequency space (OTFS) modulation has been introduced to address such problems, and others. A brief overview of the OTFS technology is provided in the present document.

One additional desirable feature of communications systems is its security aspect. For example, users and network operators may prefer communications scheme that offer low probability of intercept and inherently provide secure communication by reducing or eliminating probability of detectability or eavesdropping on the communication. Another security aspect is being able to avoid interference or jamming of communication signals. A class of transmission schemes, generally called ultra-wide band (UWB) modulation, provides such security features for signal transmissions. In a typical UWB scheme, a transmission signal is spread over a large frequency band (e.g., upwards of 200 MHz or 1 GHz), such that each frequency carries a very small amount of transmitted information and low power. Such a transmission is therefore undetectable using typical signal detection techniques and furthermore provides robustness against interference that degrades transmission quality at certain frequencies. The present document provides a brief overview of the UWB technology.

While OTFS and UWB schemes provide significant performance improvements with respect to certain desirable aspects of a signal communication scheme, to date, no scheme is known that combines the beneficial features of both OTFS and UWB technologies. The present document provides techniques that can be incorporated into transmitter and receiver technologies for transmitting or receiving a signal using a transmission scheme that combines OTFS and UWB techniques.

2. Example Wireless Systems

FIG. 1A shows an example of a wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IoT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 1B:
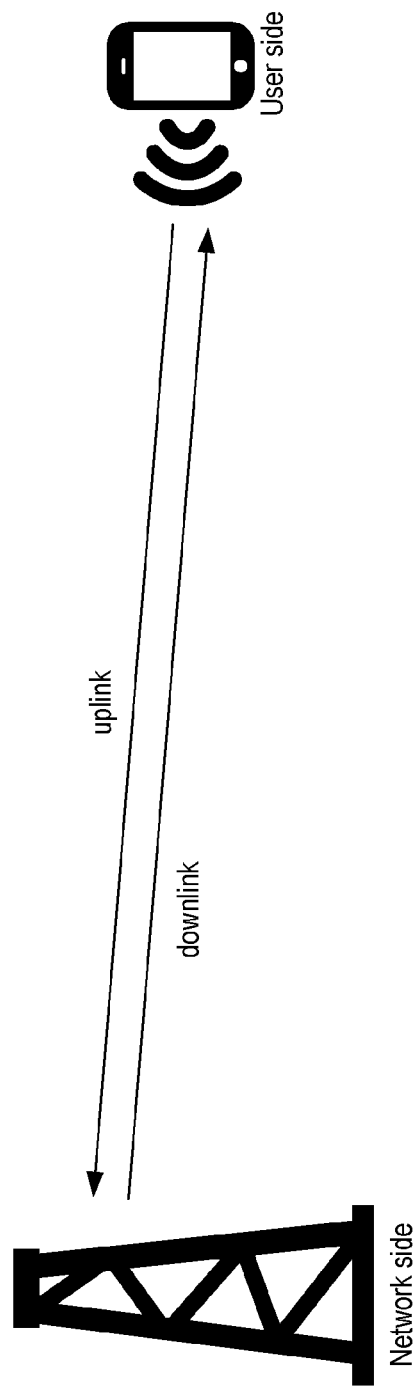
FIG. 1B shows a simplified example of a wireless communication system in which uplink and downlink transmissions are performed.

FIG. 1B shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 1B, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 1B). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, orthogonal time frequency space, or OTFS, multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., the user devices and a network station such as a base station).

3. Brief Introduction to OTFS

The orthogonal time frequency space (OTFS) method is based at least in part upon the realization that in many cases various advantages may accrue from spreading the data of a single symbol over multiple time-spreading intervals shared with other symbols. In contrast with prior art modulation techniques, the OTFS method may involve convolving a single data symbol over both a plurality of time slots, a plurality of frequencies or spectral regions (spread spectrum), and a plurality of spectral shapes. This approach to data convolution results in superior performance over impaired communications links.

In one aspect, and as is indicated below by Equation (1), the OTFS method recognizes that a wireless channel may be represented as a weighted superposition of combination of time and Doppler shifts:

$$h^a(\varphi)(t) = \sum_{\tau, u} a(\tau, u) e^{j2\pi ut} \varphi(t + \tau) \quad (1)$$

In contrast to parameters associated with existing channel models, the time-frequency weights ($\tau$, u) of Equation (1) are two-dimensional and are believed to fully characterize the wireless channel. The time-frequency weights ($\tau$, u) are intended to represent essentially all of the diversity branches existing in the wireless channel. This is believed to substantially minimize the fading effects experienced by the OTFS system and other communication systems generally based upon two-dimensional channel models relative to the fading common in systems predicated upon one-dimensional models. Finally, in contrast to the non-stationary, one-dimensional channel models employed in conventional communication systems, the time-frequency weights ($\tau$, u) of Equation (1) are substantially stationary; that is, the weights change very slowly relative to the time scale of exemplary embodiments of the OTFS system.

Use of the two-dimensional channel model of Equation (1) in embodiments of the OTFS communication system affords a number of advantages. For example, use of the channel model of Equation (1) enables both channel multipath delay and Doppler shift to be accurately profiled simultaneously. Use of this model and the OTFS modulation techniques described herein also facilitate the coherent assembly of channel echoes and the minimization of fading phenomena, since every symbol experience substantially all of the diversity branches present within the channel. Given that the two-dimensional channel model is essentially stationary, every symbol is deterministically distorted (smeared) according to substantially the same two-dimensional pattern. This stable, accurate characterization of the communication channel in two dimensions on an ongoing basis further enables the OTFS system to minimize data distortion by "customizing" how each bit is delivered across the channel. Finally, use of a two-dimensional channel model enables effective signal separation by decoupling and eliminating mutual interference between multiple sources.

Figure 2:
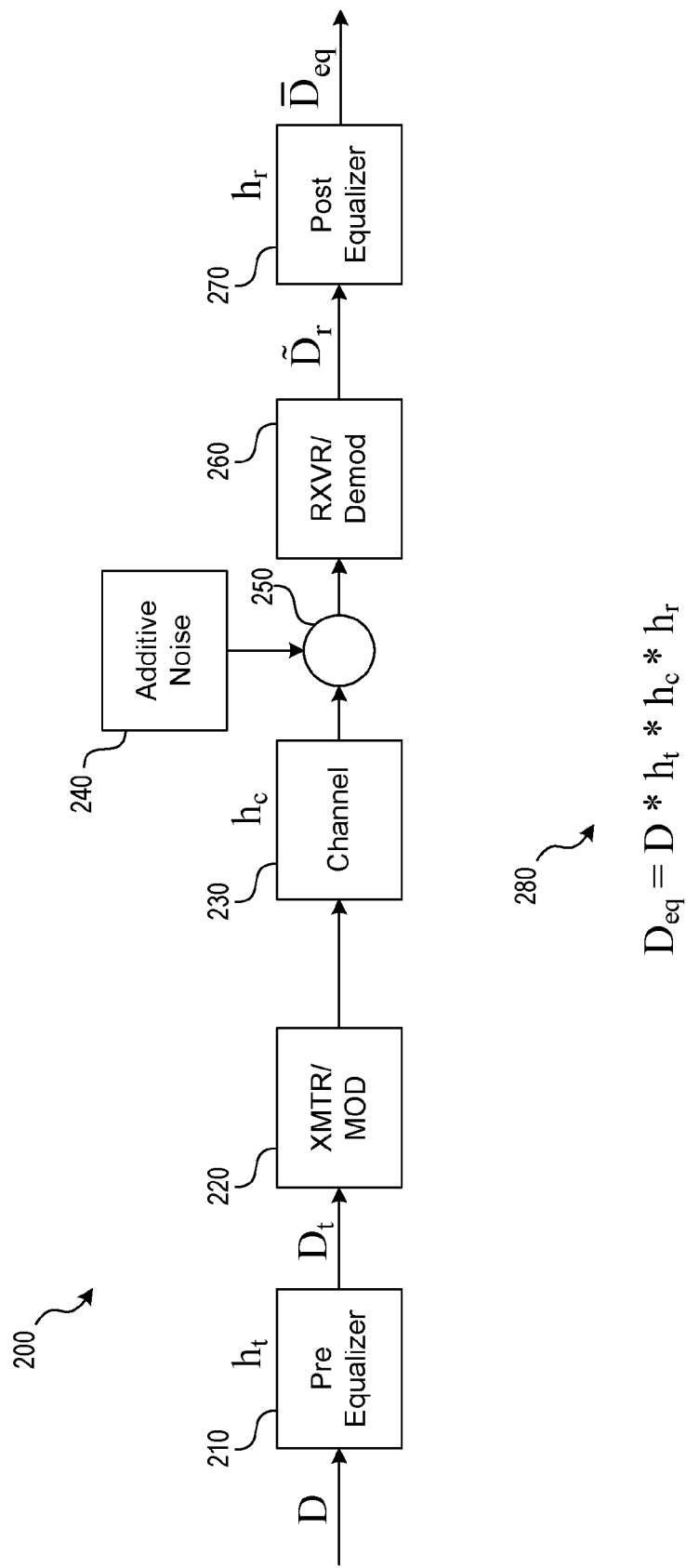
FIG. 2 shows an example mathematical model used to model communication in the wireless communication system of FIG. 1A.

FIG. 2 illustrates an example of a mathematical model 200 that can be used to model time/frequency selective fading. A transmit side of the model 200 includes a pre-equalizer 210, a transmitter/modulation component 220, a channel model 230, and additive noise 240 which is combined with the transmitted signal via a summer 250. A receive side of the model 200 includes a receiver/demodulator 260 and a post equalizer 270.

The pre-equalizer 210 is used to model a pre-distortion transfer function $h_t$ that can be used to make up for changing channel conditions in the channel model $h_c$ based on feedback received over the channel from the receive side of the model, as determined by measurements made by the receiver/demodulator 260 and/or the post equalizer 270. The transmitter/modulator 220 uses modulation schemes described herein to transmit the data over the channel 230.

The receiver/demodulator 260 demodulates the signal received over the channel 230. The received signal has been distorted by time/frequency selective fading, as determined by the channel transfer function $h_c$, and includes the additive noise 240. The receiver/demodulator 260 and the post equalizer 270 utilize methods discussed herein to reduce the distortion caused by the time/frequency selective fading and additive noise due to the channel conditions. The mathematical model 200 can be used to determine the nature of the equalized data $D_{eq}$ by performing a mathematical combination of three transfer functions operating on the original data D. The three transfer functions include the transmitter transfer function hr, the channel transfer function $h_c$ and the equalizer transfer function hr.

Embodiments of the OTFS methods and systems described herein are based, in part, upon the realization that spreading the data for any given symbol over time, spectrum, and/or spectral shapes in the manner described herein yields modulated signals which are substantially resistant to interference, particularly interference caused by Doppler effects and multi-path effects, as well as general background noise effects. Moreover, the OTFS method is believed to require less precise frequency synchronization between receiver and transmitter than is required by existing communication systems (e.g., OFDM systems).

In essence, the OTFS method convolves the data for a group of N.sup.2 symbols (herein called a "frame") over both time, frequency, and in some embodiments spectral shape in a way that results in the data for the group of symbols being sent over a generally longer period of time than in prior art methods. Use of the OTFS method also results in the data for any given group of symbols being accumulated over a generally longer period of time than in prior art methods. However, in certain embodiments the OTFS method may nonetheless enable favorable data rates to be achieved despite the use of such longer transmission periods by exploiting other transmission efficiencies enabled by the method. For example, in one embodiment a group of symbols may be transmitted using the same spread-spectrum code. Although this could otherwise result in confusion and ambiguity (since each symbol would not be uniquely associated with a code), use of the OTFS method may, for example, enable the symbols to be sent using different (but previously defined) spread-spectrum convolution methods across a range of time and frequency periods. As a consequence, when all of the data corresponding to the symbols is finally accumulated within the receiver, the entire frame or group of symbols may be reconstructed in a manner not contemplated by prior art techniques. In general, one tradeoff associated with the disclosed approach is that either an entire multi-symbol frame of data will be correctly received, or none of the frame will be correctly received; that is, if there is too much interference within the communication channel, then the ability to successfully deconvolve and retrieve multiple symbols may fail. However, as will be discussed, various aspects of the OTFS may mitigate any degradation in performance which would otherwise result from this apparent trade-off.

For the OTFS model of a channel as described above, the channel can be modeled using a small set of dominant reflectors. Such a representation of the channel provides a concise and robust channel representation that is mathematically less complex (compared to traditional channel acquisition techniques). Furthermore, use of second order statistics allowed for prediction of channel at a different (future) time, or in a different frequency band, based on delay-Doppler domain modeling of a channel. Such a compact model thus allows for robust acquisition, estimation and prediction of channel.

One advantageous aspect of OTFS is the use of second order statistics for channel representation allows for a stationary channel model that does not need to be changed frequently. In some embodiments, a channel may be modeled into a stationary portion and a non-stationary portion that is updated on an occasional basis. Such a model reduced the bandwidth overhead of reference signal and/or feedback signal transmissions. Put differently, the channel state information (CSI) remains relatively static and required less frequent updates than conventional 4G or 5G New Radio (NR) technology.

As further described in the present document, OTFS waveform allows for spreading of information bits across different delay and/or Doppler values, and therefore provides mathematical ability to be invariant to mobility. Furthermore, signal precoding in delay Doppler domain may be used to further achieve efficiency of transmission.

Other advantages of OTFS technology include:

Low Complexity—this may be achieved due to efficient channel modeling (sparse channel representation) that requires infrequent updates Scheduling—channel characteristics in a different frequency band or at a future time can be predicted with high accuracy, thereby allowing accurate scheduling, including, for example, centralized scheduling in a cooperative network.

Scalable Pairing—user devices may be paired for transmission using scalable transmissions (e.g., beamforming)

Large Number of users & Number of Layers—the use of OTFS based spectral shaping in spatial domain allows for a compact communication scheme that accommodates a large number of user devices.

Backward compatibility—Several of the channel estimation techniques can work without the need of an explicit feedback for spatial multiplexing and therefore can be implemented in networks that include legacy or previous generation device.

Co-existence 4G & 5G—OTFS spectrum can be transmitted using an orthogonal frequency division multiplexing (OFDM) scheme and be made compatible with conventional 4G and 5G technologies.

Cloud-RAN Architecture—due to the ability of OTFS to perform channel estimation using a sparse channel representation and the ability to predict future channels, the channel estimation can be made robust to computational delays. This lends itself to be able to operate a cloud based channel estimation/precoding/scheduling of a radio access network (RAN), in which the backhaul delays for communication of channel estimates do not impact system performance.

Scheduler disaggregation—for a similar reason as above, the scheduling function of a network of cellular communication cells can be controlled using a scheduler that is dis-aggregated from a base station function (radio access) and can be implemented in the cloud.

Joint scheduling and Coordinated multisite—as described above, the joint scheduling of cells using a disaggregated or a cloud based scheduler allows for efficient use of spectrum within a cell and more particularly in overlapping areas of different cells.

Analytics—the cloud-based architecture that collects channel state feedback from different user devices in different cells allows for generation of analytics in which user device locations, network topology and other information about a network can be extracted for further robust operation of a wireless network.

CoMP—Cooperative Multi-Point operation of base stations is possible using the above-described scheduler aggregation and cloud-RAN techniques.

Figure 3:
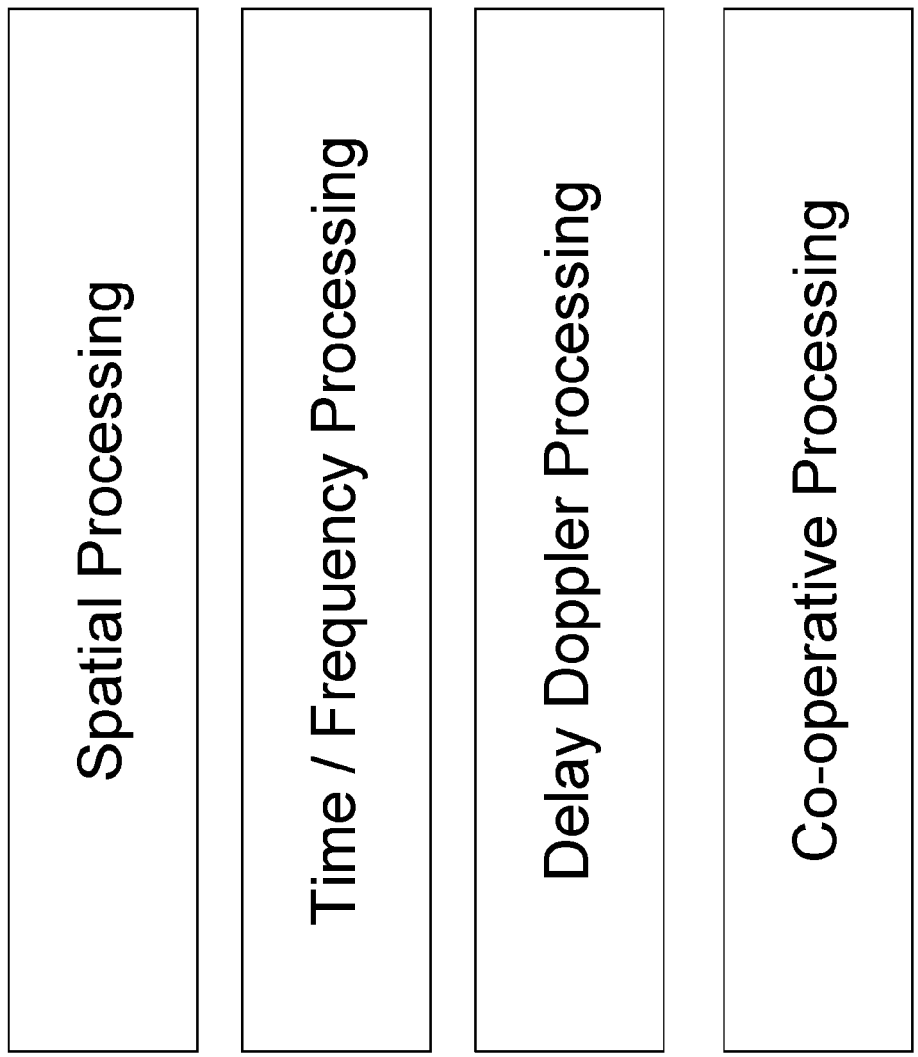
FIG. 3 depicts an example of an end-to-end wireless system implementation, at least partly using OTFS technology.

FIG. 3 depicts an example of an end-to-end wireless system implementation, at least partly using OTFS technology. As described above, various beneficial aspects include enablement of cooperative processing, channel estimation/equalization in delay Doppler domain, ability to provide additional control in time/frequency domain and spatial processing to form layered communication to increase density of devices in a cell.

Figure 4:
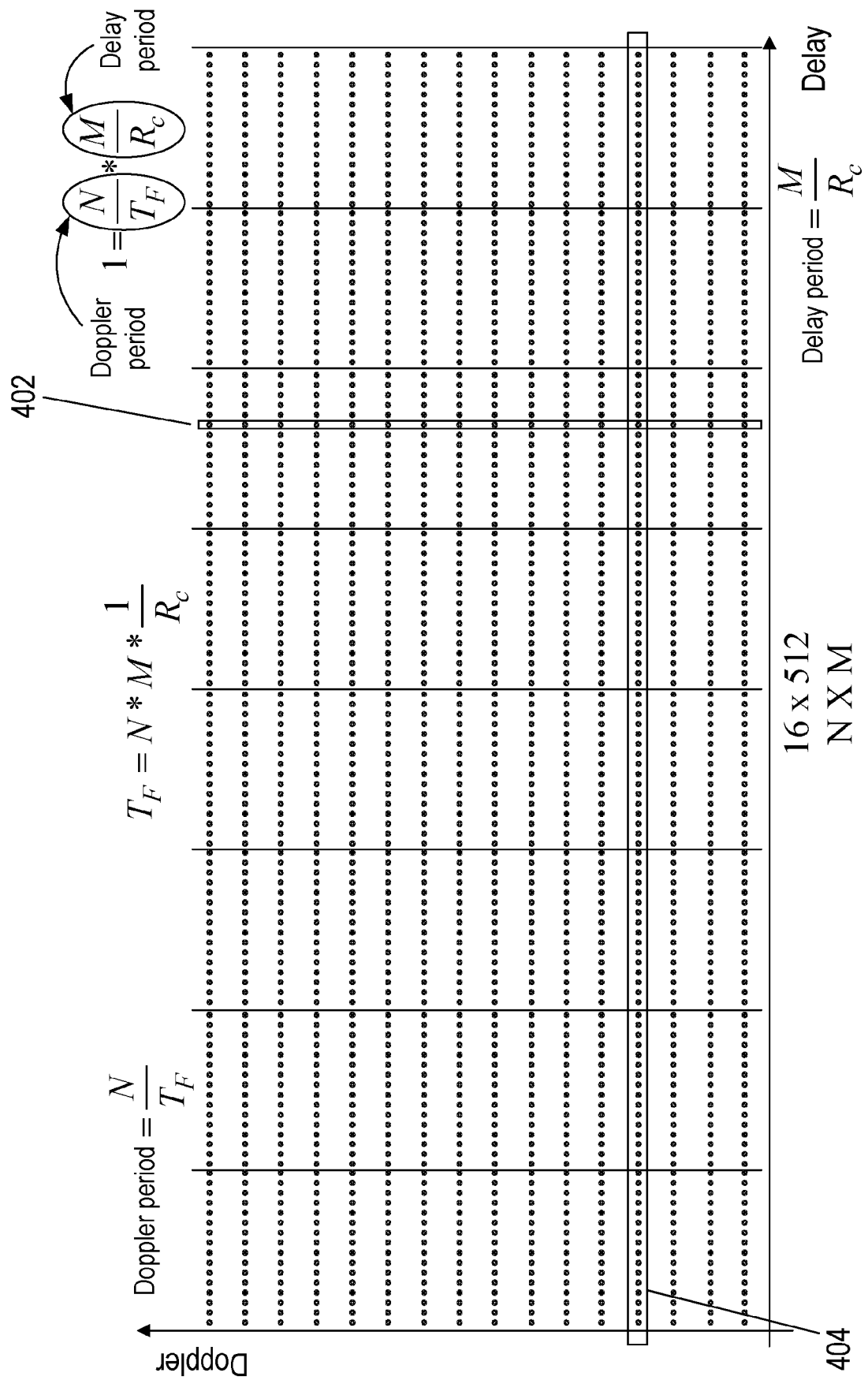
FIG. 4 shows an example of a delay-Doppler plan in which symbols that contain information bits rate show.

FIG. 4 shows an example of a delay Doppler plane in which symbols that contain information bits are shown. In FIG. 4, the horizontal axis is the delay axis and the vertical axis is Doppler axis. Each dot in the graphs shows a modulation symbol that comprises information bits. One example of a symbol 402 in the delay domain is shown by a tall rectangle that comprises all modulated bits having a same delay, but different Doppler values. The example depicted in FIG. 4 shows a delay-Doppler grid where N=16 (elements along Doppler direction) and M=512 (elements along delay direction). In this document, a delay-Doppler element can be equivalently represented by a delay-Doppler coordinate. Without a loss of generalization, the coordinate for an element can be assumed to be the center of the element. Herein, the delay resolution is reciprocal of channel bandwidth, and the Doppler resolution is inversely proportional to the frame time used for the communication.

Figure 5:
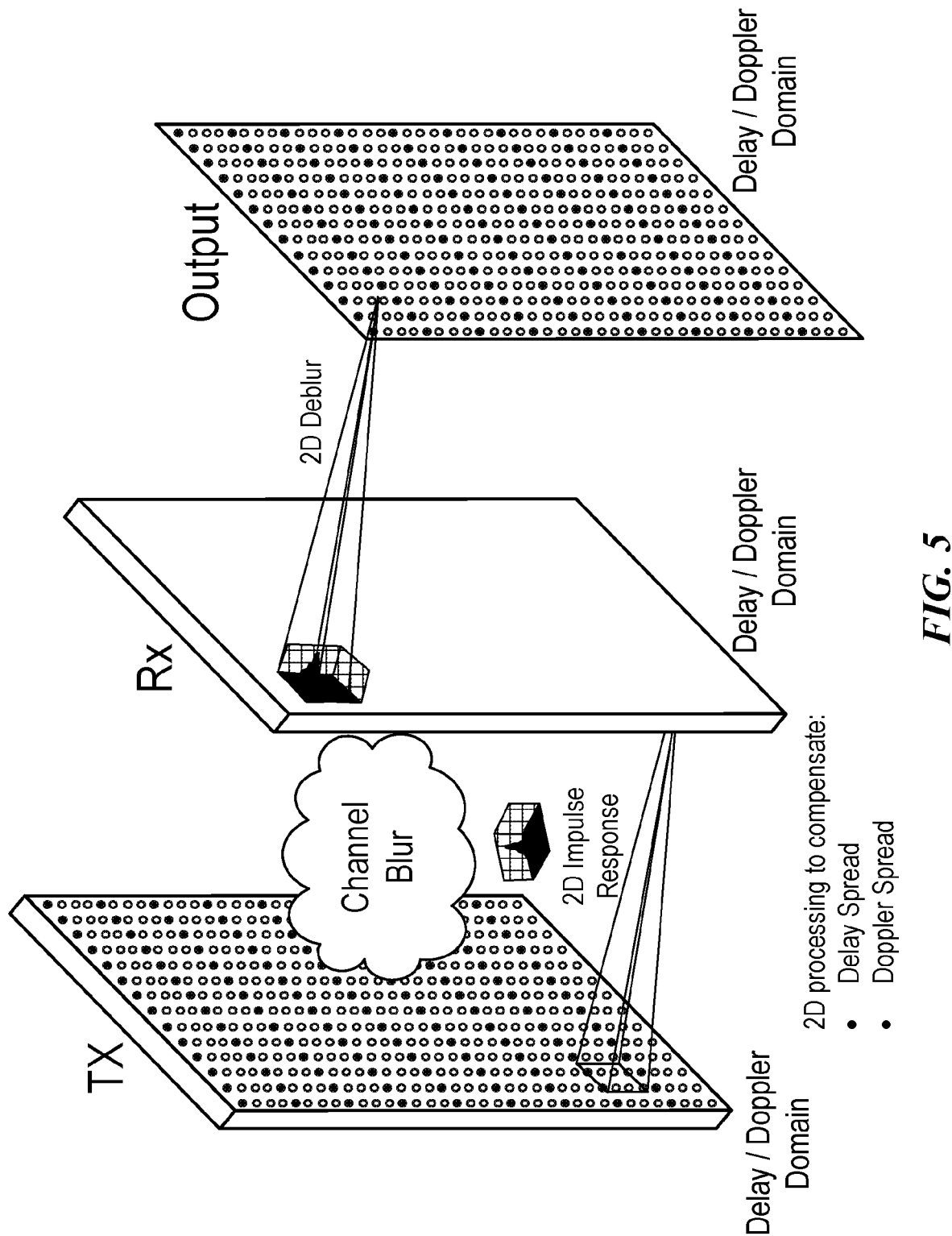
FIG. 5 pictorially depicts the concept of twisted convolution.

FIG. 5 pictorially depicts the concept of twisted convolution. Starting from left to right, the two-dimensional arrangement of symbols in the delay-Doppler domain is depicted on the transmitter side. During transmission from the transmitter TX to a receiver Rx, the signal may get blurred or distorted based on a 2D impulse response of the channel. This alteration is depicted as channel blur. The received signal in the delay Doppler domain may be recovered using deblurring to obtain estimates of the transmitted symbols. The end-to-end process is considered to include twisted convolution due to the changes in delay-Doppler position of the transmission waveform.

Figure 6:
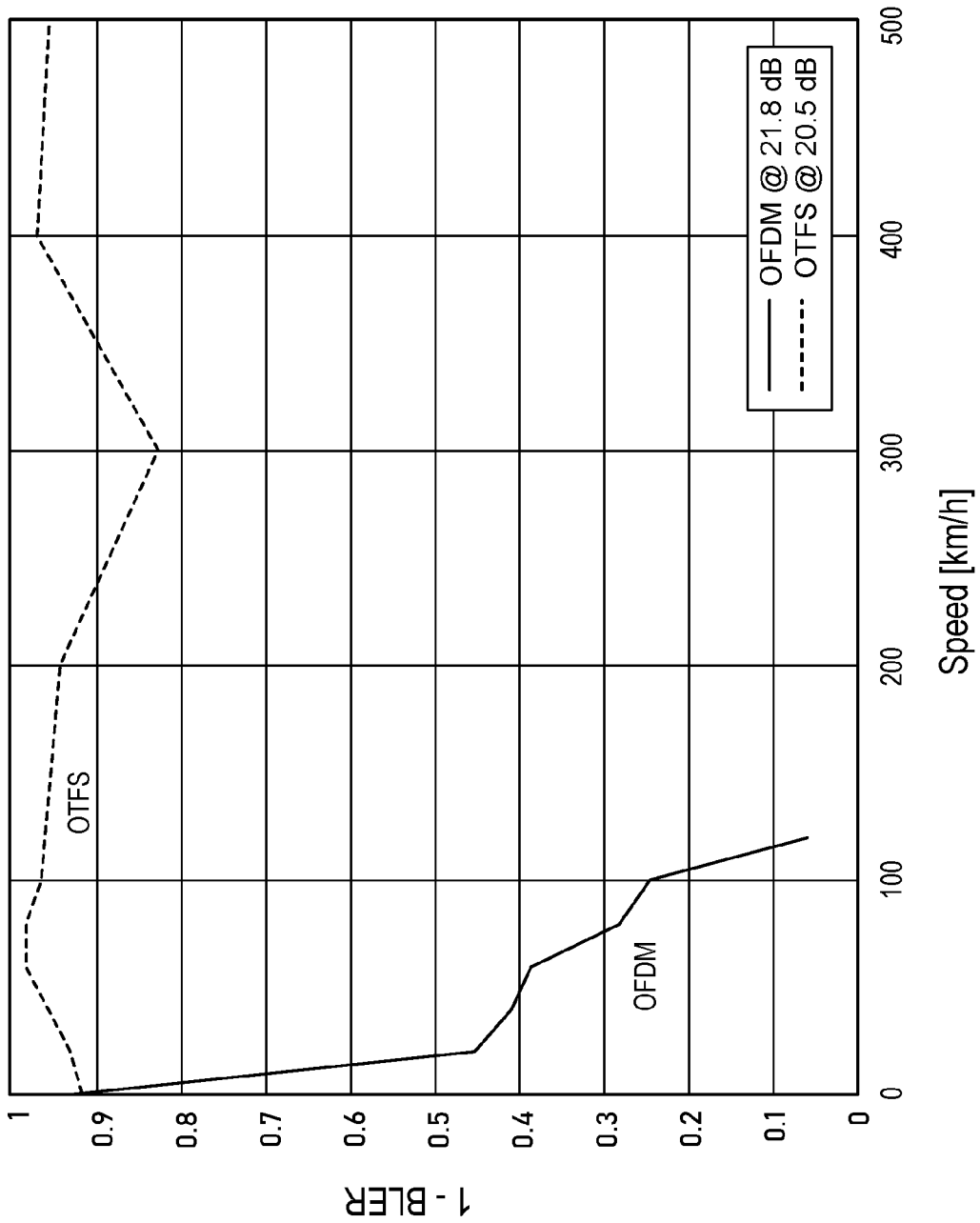
FIG. 6 shows example of superiority of OTFS modulation at high mobility.

FIG. 6 is a graph showing superiority of OTFS technology over the traditional orthogonal frequency division multiplexing (OFDM) technology. As shown in the graph, the measure of (1-BLER), which is proportional to the throughput (vertical axis) of OTFS modulation is relatively flat across relative mobility between a transmitter and a receiver (horizontal axis showing speed differential). As can be seen from the graph, conventional OFDM technology fails to cope up with Doppler degradation that exceeds 100 to 120 km per hour, while OTFS modulated signals can be successfully received without significant degradation in throughput.

Figure 7:
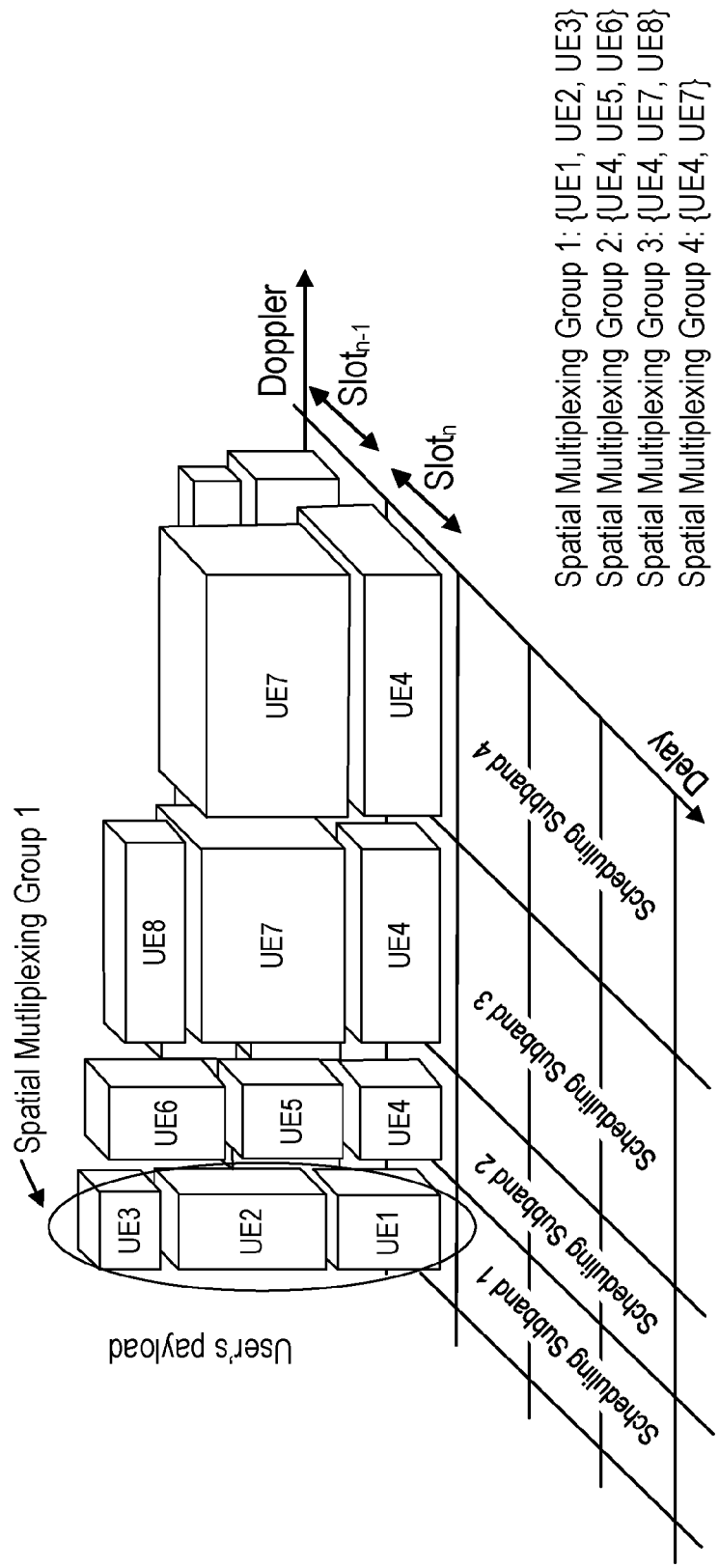
FIG. 7 shows an example of multi-user multiplexing in an OTFS communication system.

FIG. 7 shows an example of multi-user multiplexing using delay-Doppler transmission resources. Information bit traffic from various users (or user devices) may be multiplexes along the Doppler dimension and the delay dimension, and furthermore spatially multiplexed to achieve greater transmission bandwidth use. For example, spatial multiplexing group 1 may include traffic for three user devices—UE1, UE2 and UE3, that are spatially multiplexed and occupy same delay/Doppler resources. In this context, the Doppler domain is divided into subbands while the delay domain is divided into delay slots (or time slots) for multiplexing.

4. OTFS and UWB

Figure 8A:
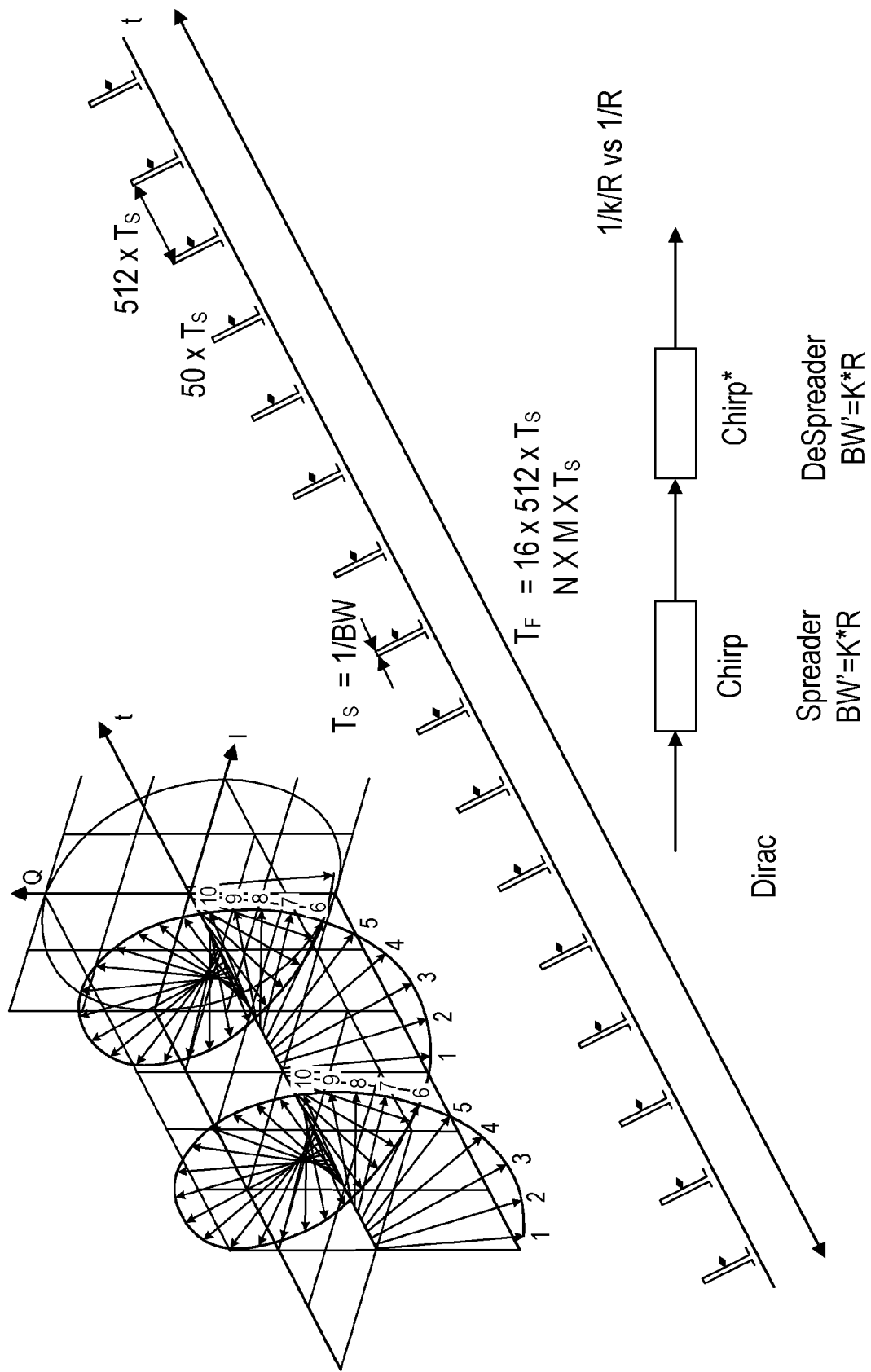
FIG. 8A pictorially depicts an example arrangement of pulses in an OTFS waveform.

FIG. 8A pictorially depicts an example arrangement of pulses in an OTFS modulation scheme. As shows along the 2D plot of I and Q axes (horizontal and vertical) as signal transmissions progress along the time axis, the phase vector is shown to make a rotation along I-Q axis as the phase of the pulses advances through the frame. The time pulses corresponding to the delay-Doppler domain symbols with the dashed line underneath the pulse depicting the underlying 512 delay elements. The time pulses can be considered as Dirac delta functions and passed through a chirp function that causes the energy to spread in a bandwidth that corresponds to K*R dilation. At the receiver side, the signal may be passed through an inverse chirp processing despreader to generate an estimate of the transmitted signal.

Figure 8B:
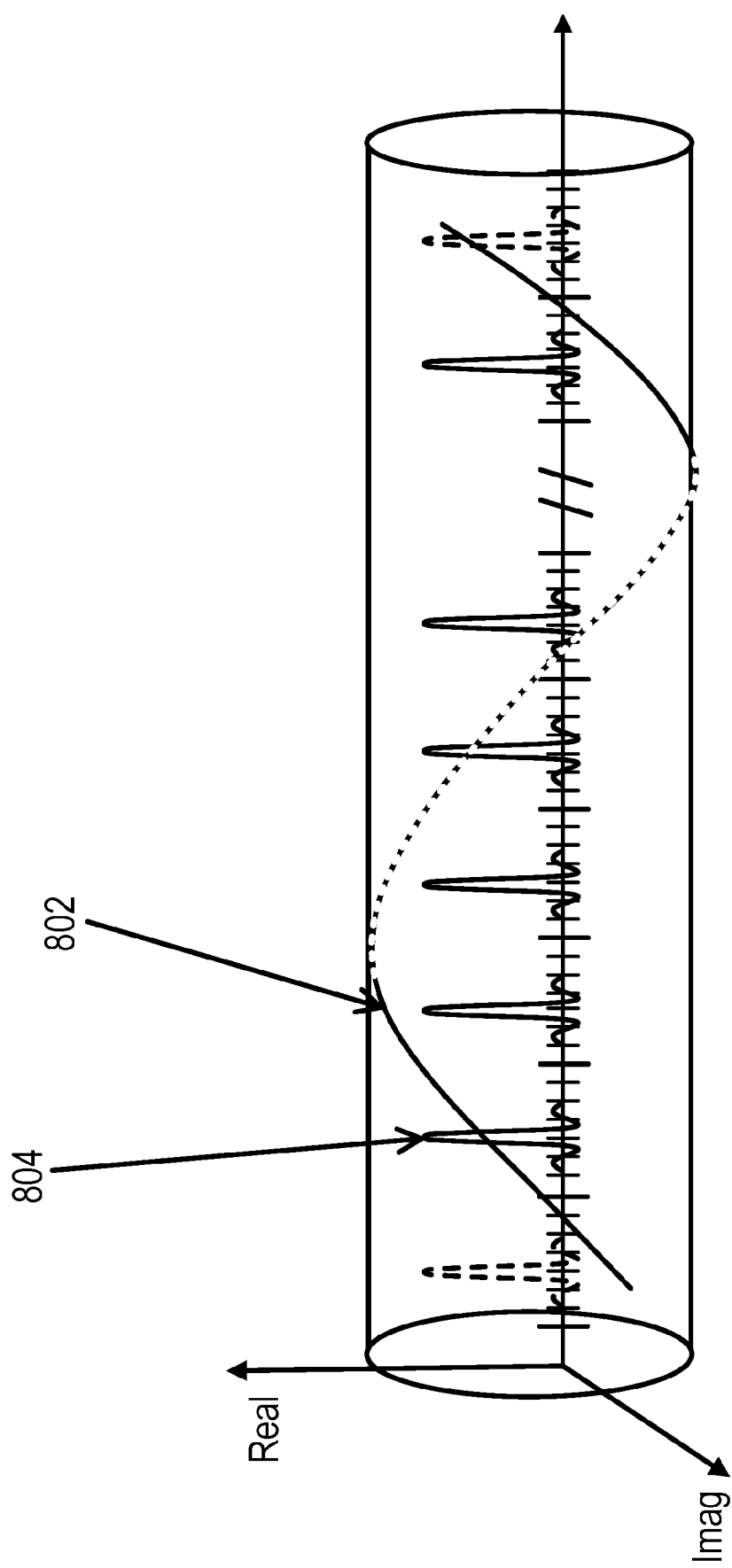
FIG. 8B shows an example of an OTFS waveform.

FIG. 8B shows another depiction of an OTFS waveform. As depicted, an OTFS waveform can be conceptually considered to comprise time-localized pulses (804) that are frequency localized due to modulation from a phase function (802) which modifies the pulses along time axis.

Figure 9:
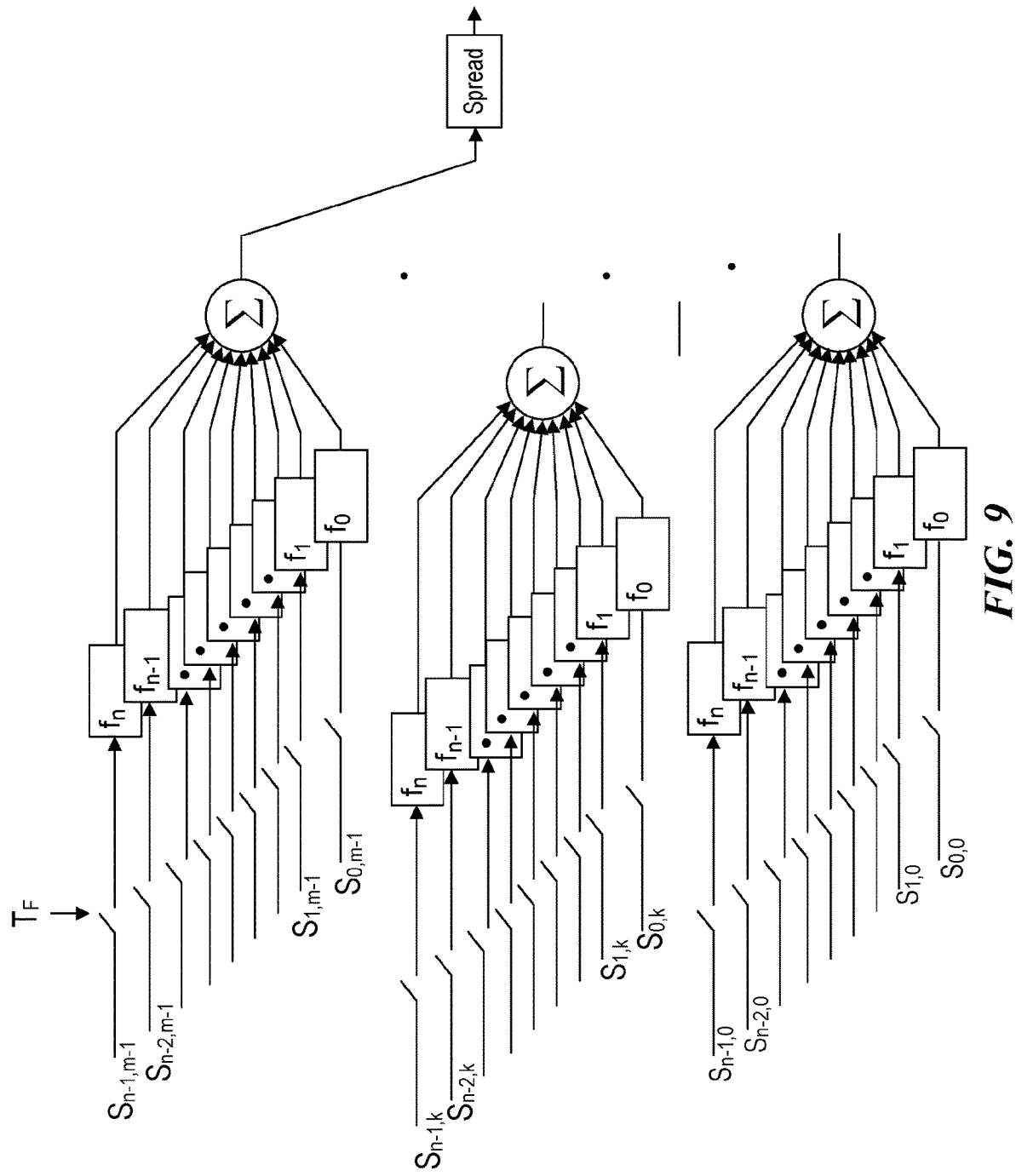
FIG. 9 depicts an example of use of a filter bank for generating a transmission waveform.

FIG. 9 depicts an example of use of a filter bank for generating a transmission waveform from pulses of the OTFS waveform. As depicted in the figure, successive pulses may be processed through filter functions $f_0$ to $f_{n-1}$, which map the pulses to a predetermined frequency band, followed by a summation of the resulting frequency mapped signal. The resulting signal is spread using a spreading technique which may include using chirp spread spectrum to generate an UWB signal. In some embodiments, an UWB signal may be generated using direct chaos communication (DCC) scheme. In some embodiments, a pseudo-noise based UWB signal generation technique may be used. In some embodiments, frequency hopping may be used generate the output signal waveform. Other techniques for spreading the resulting transmission waveform in time and/or frequency domain may be used in other embodiments.

Figure 10:
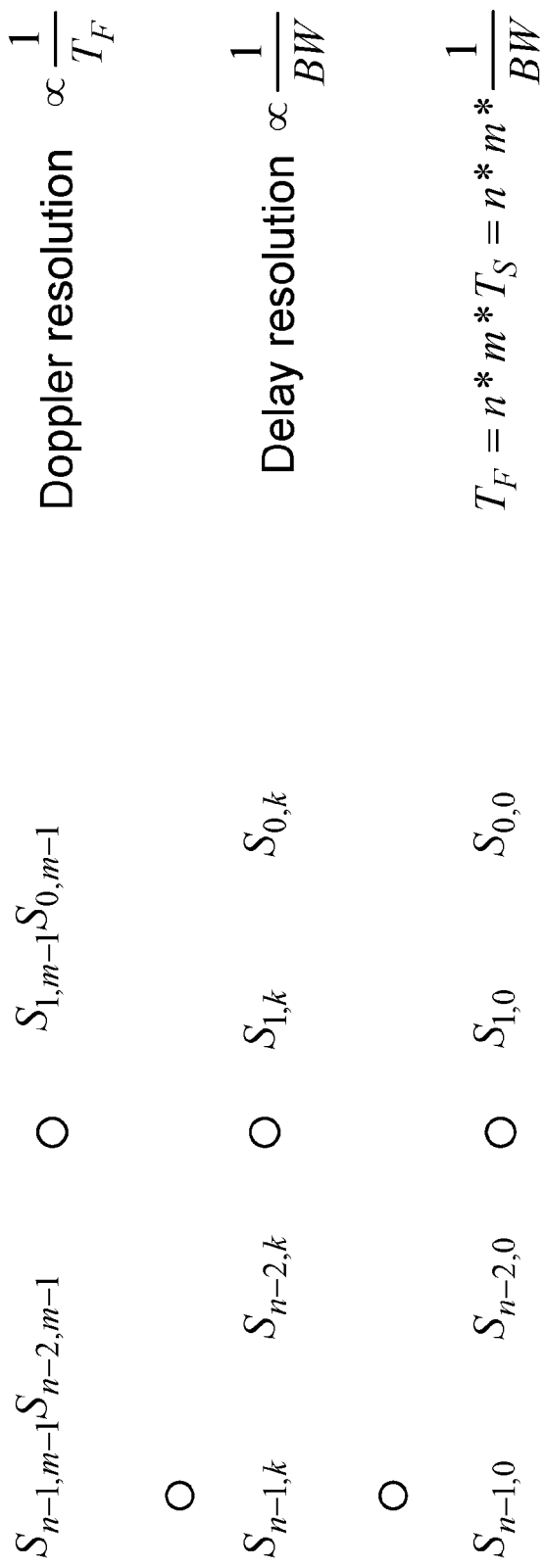
FIG. 10 shows mathematical relationships among various transmission parameters.

FIG. 10 shows mathematical relationships among various transmission parameters used for generating the OTFS waveform.

Figure 11:
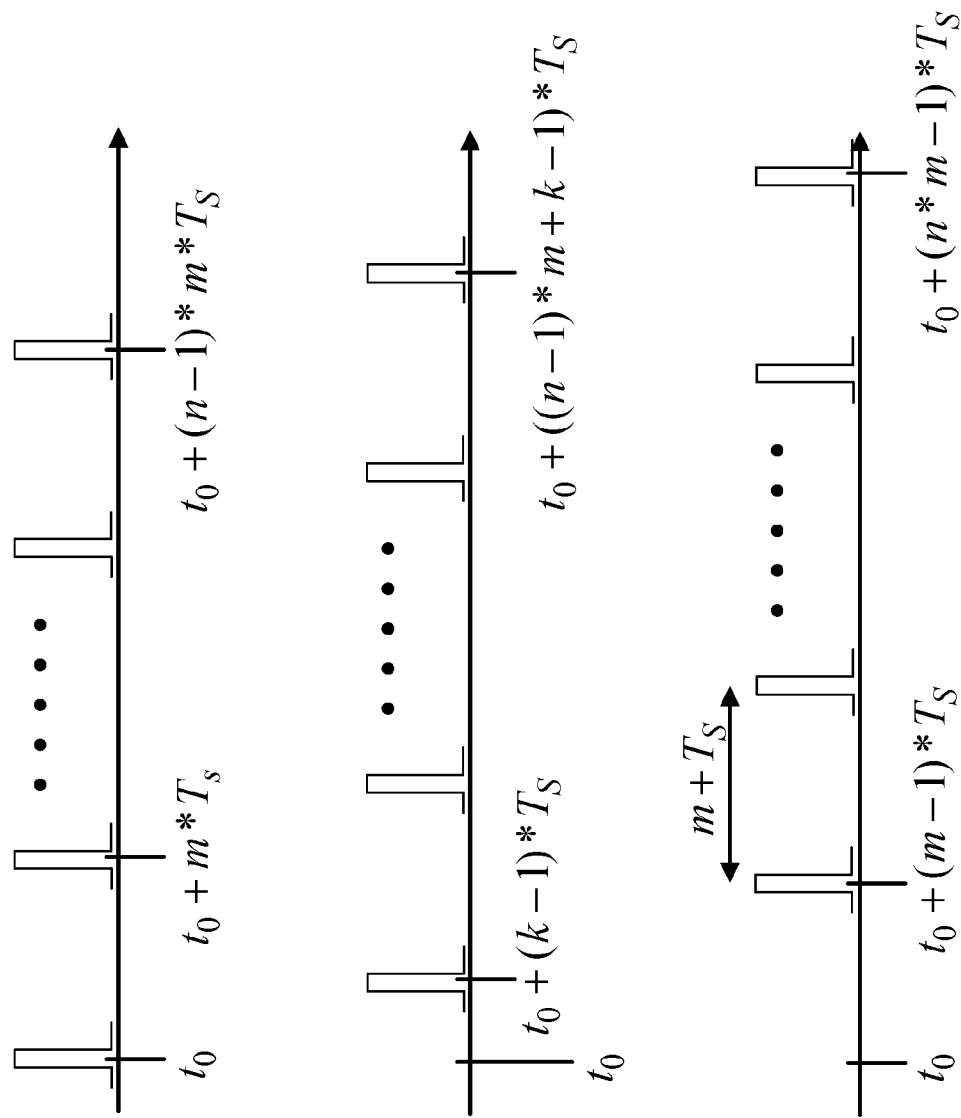
FIG. 11 shows time domain representation of an OTFS transmission waveform.

FIG. 11 shows time domain representation of the pulses in an OTFS communication scheme. Starting from the top of the graph, every next row below it shows the that the pulses are shifted in time corresponding to a grid of delay-Doppler resource grid. For the example depicted in FIG. 4, there will be 512 pulse trains (rows) of 16 pulses each, with pulses in each next train shifted from previous pulse by an offset value. Each pulse in a delay-Doppler grid is interpreted as corresponding to a delay-Doppler element with a delay-Doppler coordinate (that, for example, is positioned in the center of the respective delay-Doppler element).

Figure 12:
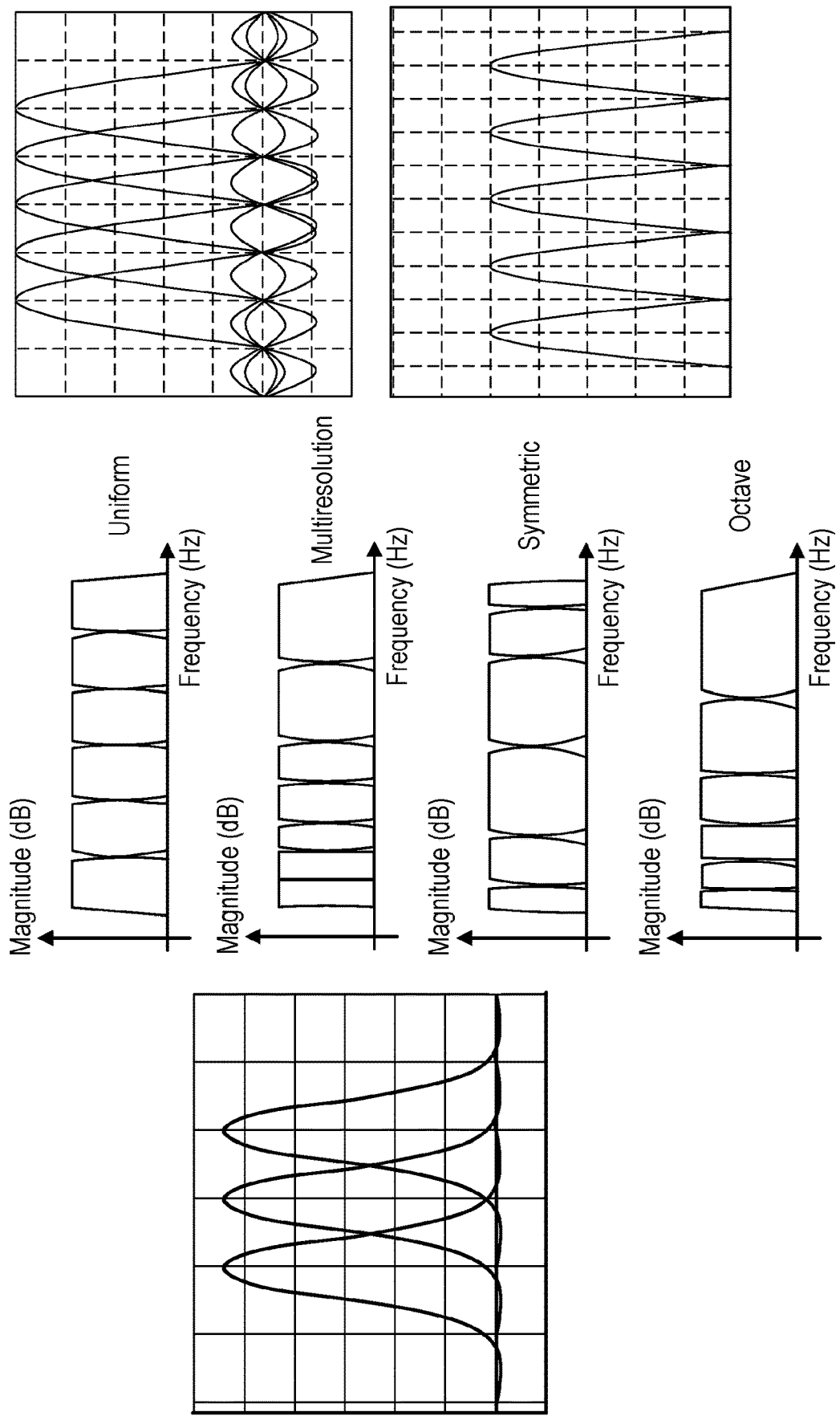
FIG. 12 shows an example of a spreading scheme.
Figure 13A:
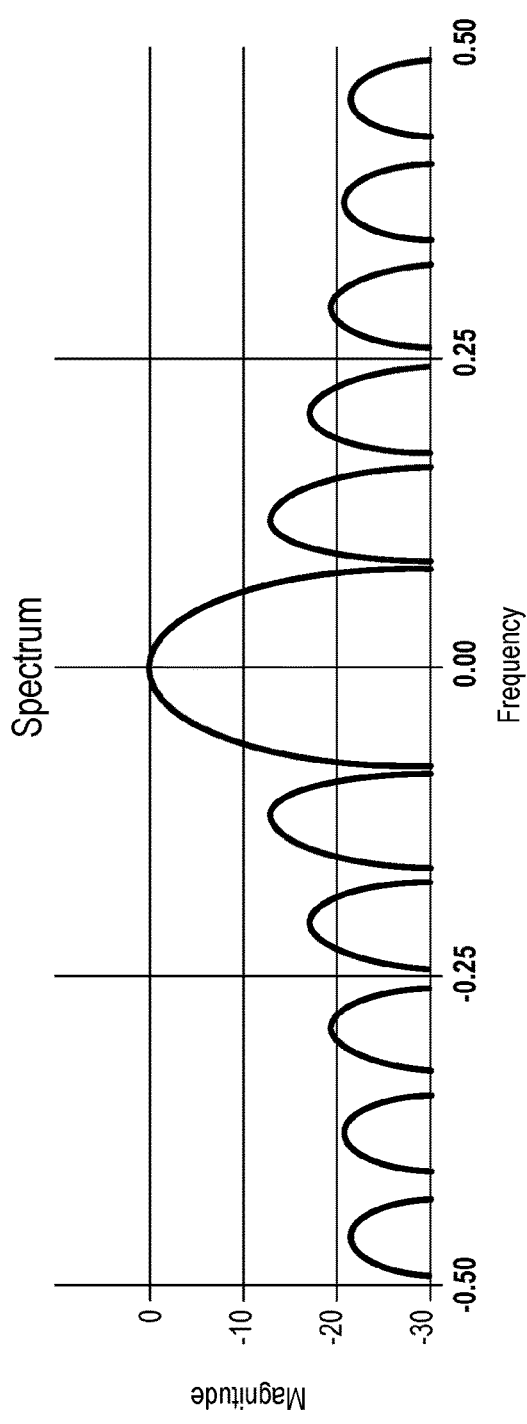
FIG. 13A to 13D show examples of frequency responses of filters used for processing a transmission waveform.
Figure 13B:
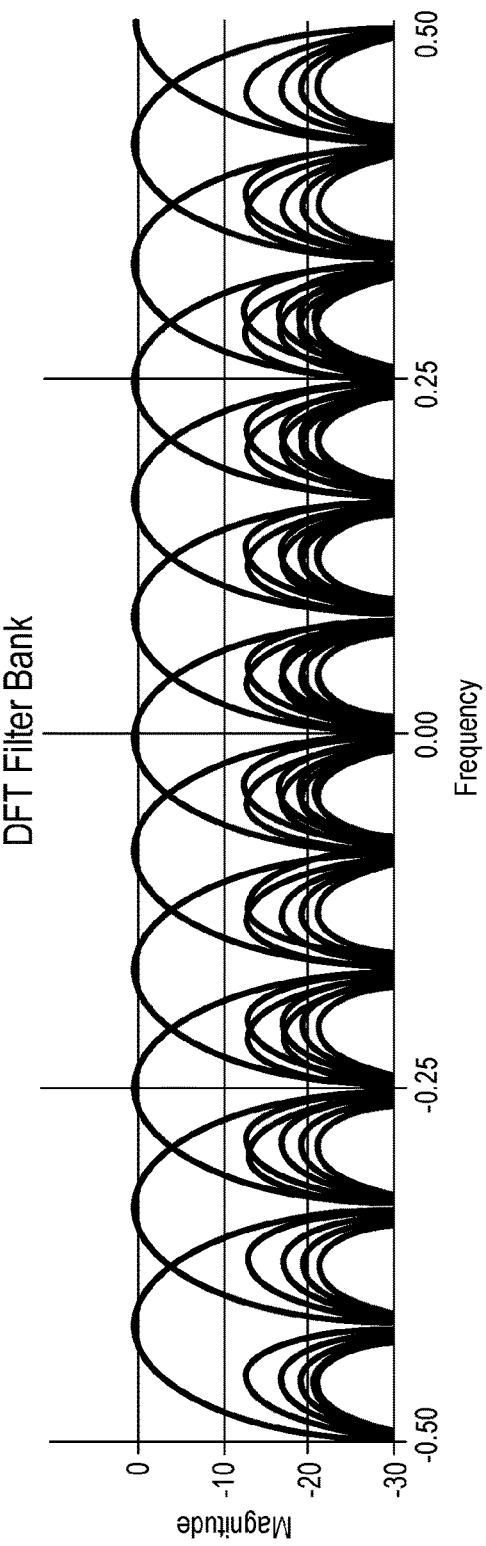
Figure 13C:
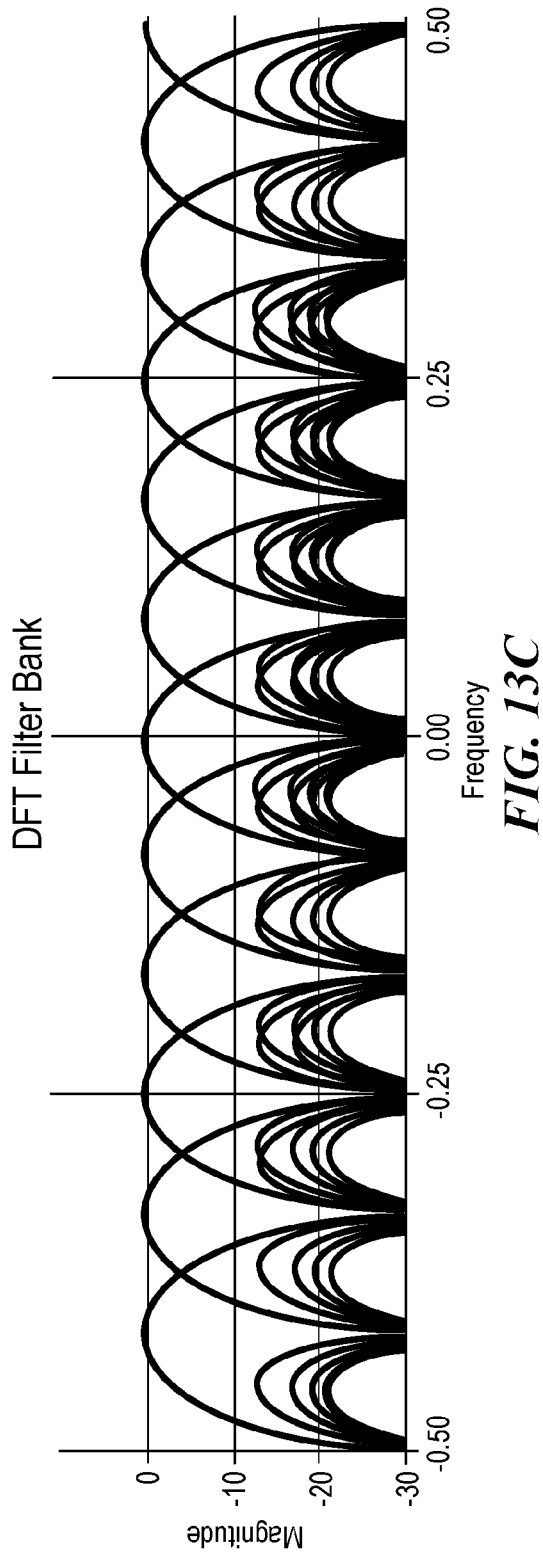
Figure 13D:
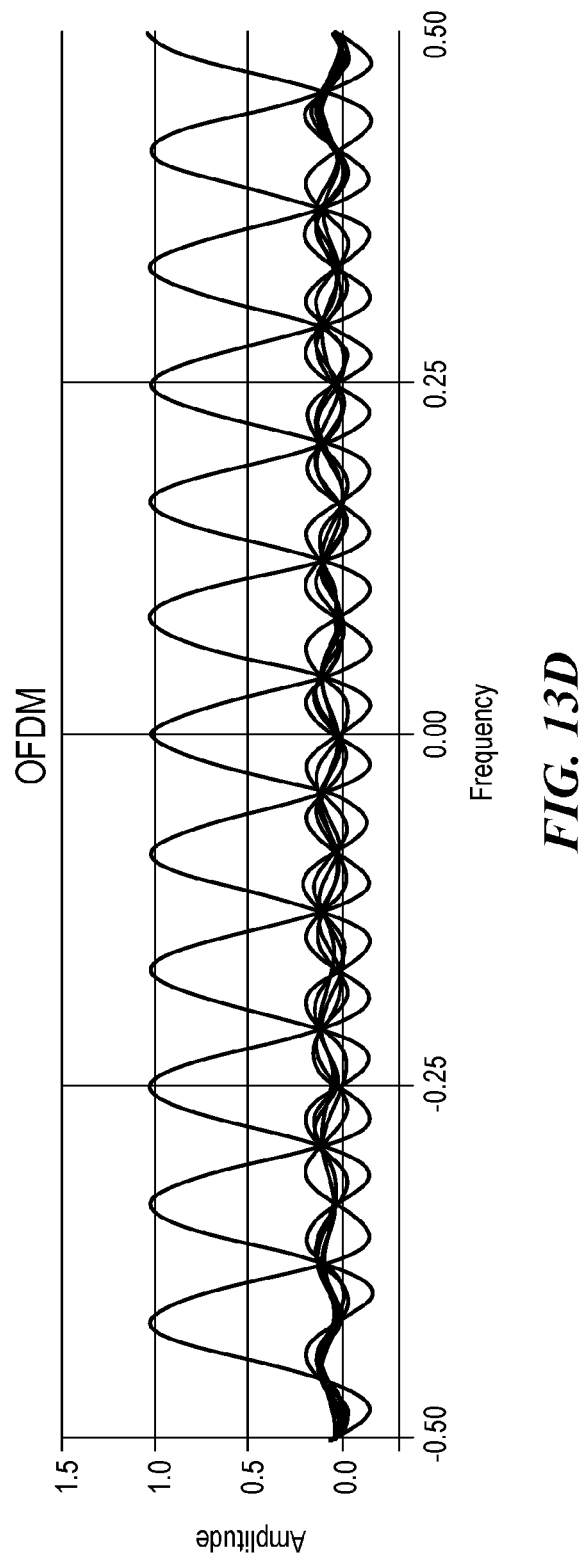

FIG. 12 shows frequency response graphs of filter banks that may be used for generating the output waveform. Various possible filter banks include a uniform filter bank, a multiresolution filter bank, a symmetric filter bank or an octave filter bank. The rightmost graphs show example frequency responses of the filters used by such filter banks.

FIG. 13A-13D show examples of frequency responses of filters used for processing a transmission waveform.

Figure 14:
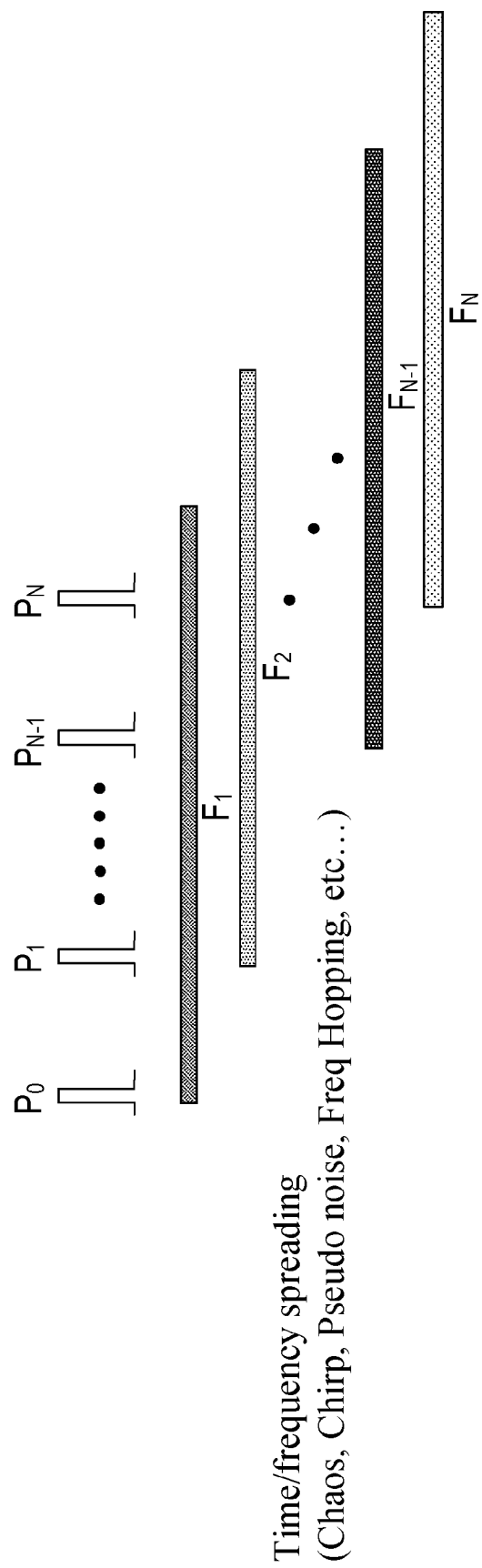
FIG. 14 shows an example of spreading time frequency pulses in frequency domain to generate an ultrawideband signal.

FIG. 14 shows an example of spreading time frequency pulses in frequency domain to generate an output signal that is spread in the frequency domain. The spreading can be done such that the pulses are mapped to non-overlapping frequency bands (bottom arrangement) or over-lapping frequency bands (middle arrangement).

Figure 15:
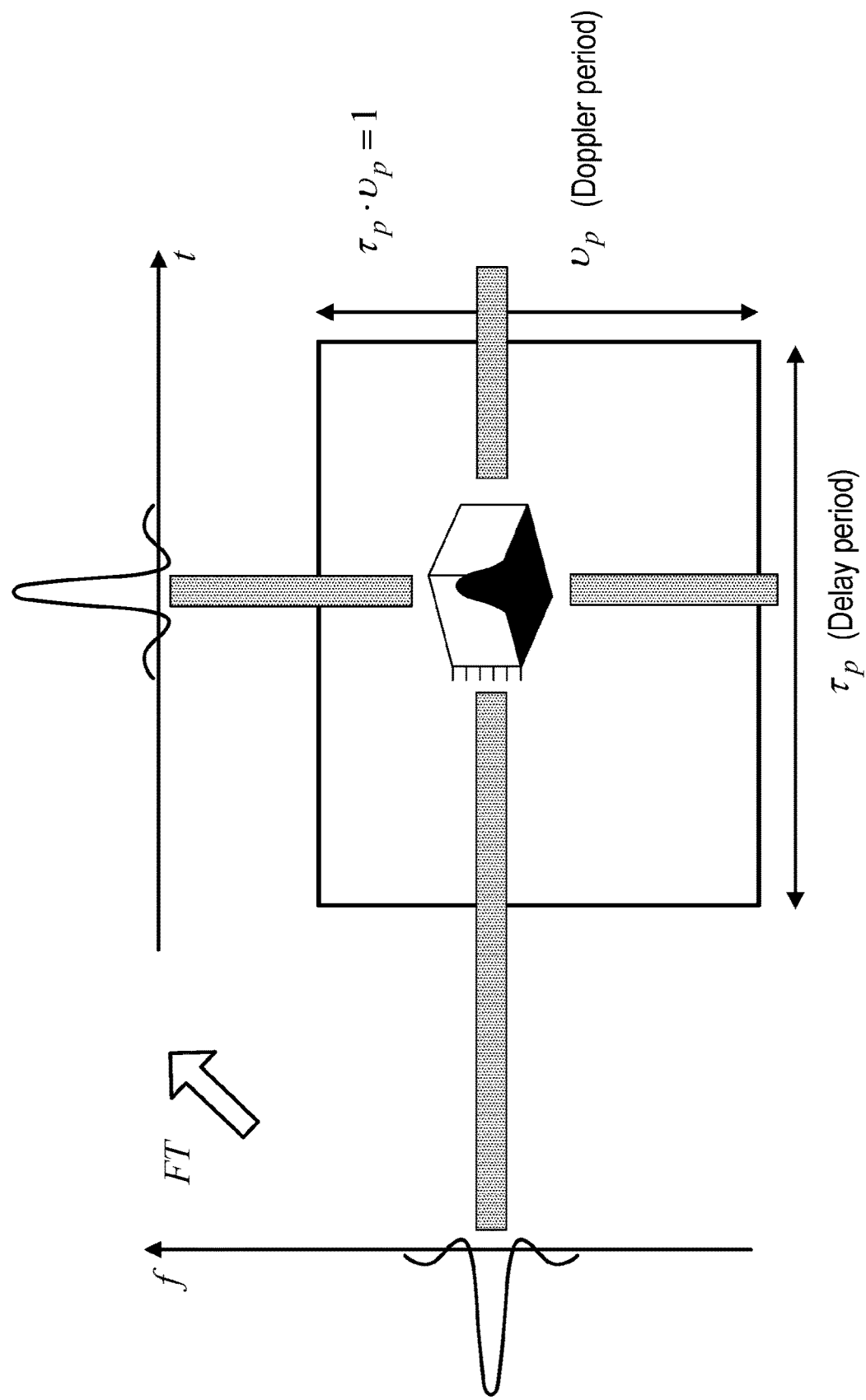
FIG. 15 shows an example of localization properties of a transmission waveform in delay-Doppler domain.

FIG. 15 shows an example of a transmission waveform in delay-Doppler domain. Here, the vertical axis represents frequency and horizontal axis represents time. A conventional pulse that is frequency limited, is not limited in time, while another convention pulse that is time limited, will not be limited in frequency. By contrast, the delay-Doppler pulse, shown in the center, will maintain its 2-D localized shape that remains quasi periodic (same shape, different phase) throughout the delay-Doppler plane.

5. OTFS Transmission and Reception

The dimensions of the channel estimation area depend on the expected channel response and its delay and Doppler spreads. Within the channel estimation area, pilot symbols may be placed. A pilot symbol has a known value, and its power may be larger than the other data symbols.

Figure 16A:
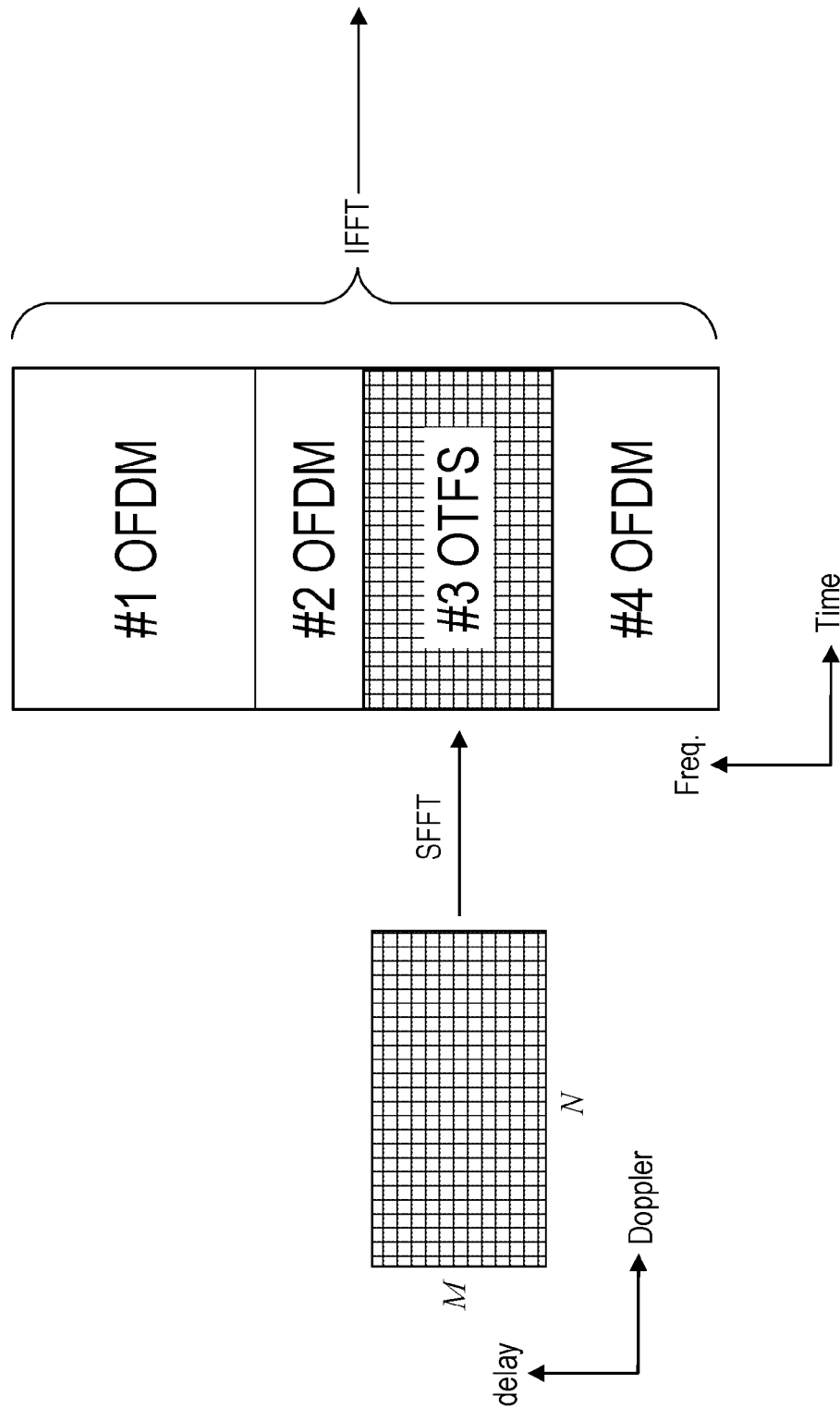
FIG. 16A shows an example of a transmission method in which a delay-Doppler grid is transformed to a time-frequency grid using a Symplectic Fast Fourier Transform (SFFT).
Figure 16B:
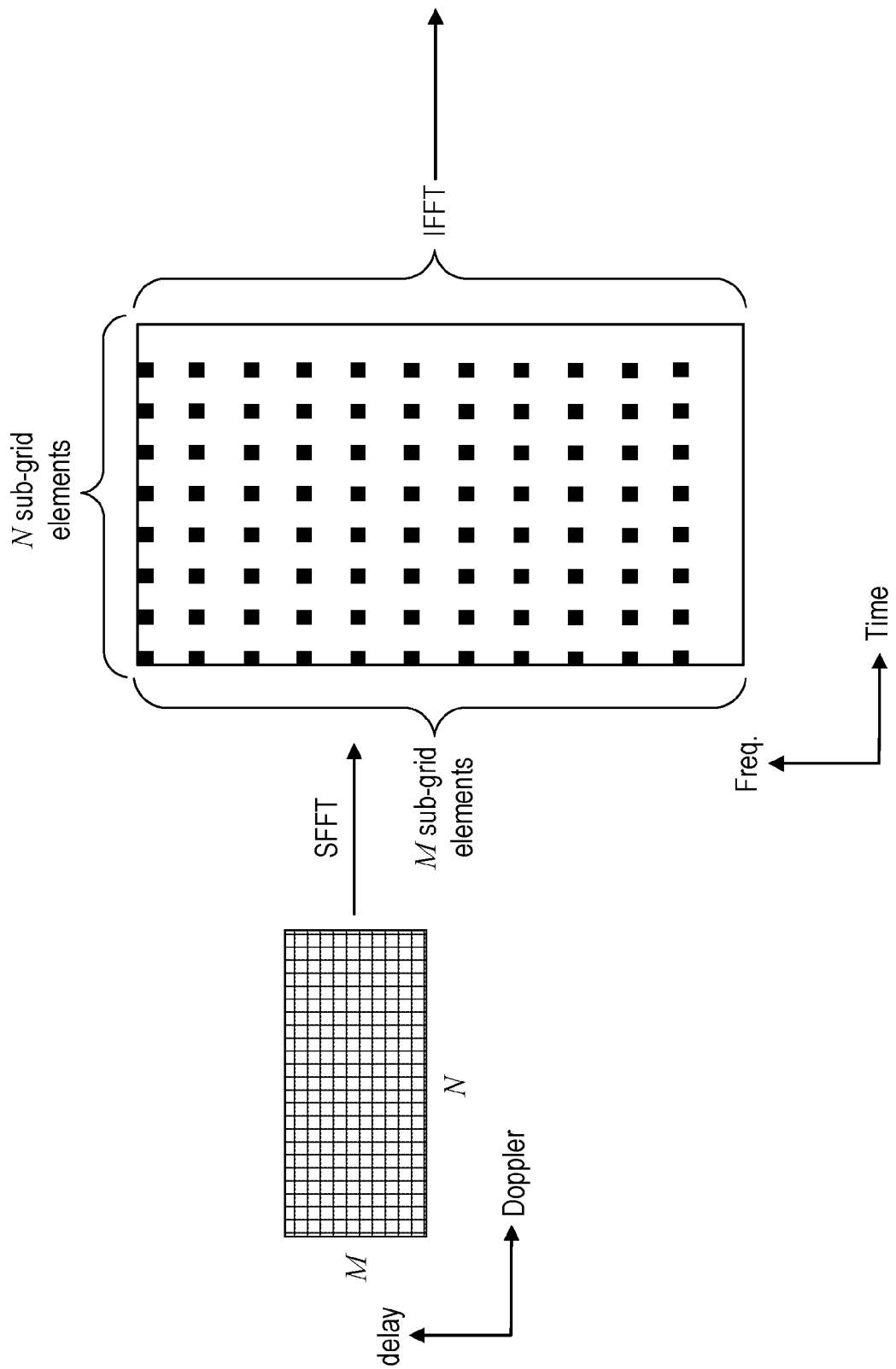
FIG. 16B shows an example of a transmission method in which a delay-Doppler grid is transformed to a time-frequency sub-grid.

The delay-Doppler grid may be transformed to a transmission waveform in one of the following methods:

1. Transformation to a time-frequency equivalent grid via a discrete Symplectic Fast Fourier Transform (SFFT). This method creates a time-frequency grid, like the one used for OFDM modulation. This OTFS transformed grid may be multiplexed with other time-frequency elements in the OFDM grid, as shown in FIG. 16A, thus allowing multi-user data multiplexing. Then, an OFDM waveform may be generated using an inverse Fourier transform (IFFT) over each OFDM symbol.
2. Transformation to a time-frequency equivalent sub-grid via discrete SFFT, as shown in FIG. 16B. The sub-grid is part of a larger time-frequency grid and has M elements along frequency and N elements along time. Then, an OFDM waveform may be generated using an inverse Fourier transform (IFFT) over each OFDM symbol.
3. Direct transformation to the time domain using a Zak transform over the Doppler dimension of the grid (after extending the grid in a quasi-periodic manner and applying a two-dimensional transmission pulse), as shown in FIG. 16C.

FIG. 16A shows an example of transmission method 1, where a delay-Doppler grid is transformed to a time-frequency grid using a Symplectic Fast Fourier Transform (SFFT). This transformed grid, denoted as "#3 OTFS", is multiplexed with the data of other OFDM users (denoted as #1, #2 and #4) in the overall OFDM time-frequency grid. An inverse Fast Fourier Transform (IFFT) may be applied to the OFDM symbols to generate the transmission waveform.

FIG. 16B shows an example of transmission method 2, where a delay-Doppler grid is transformed to a time-frequency sub-grid with N elements along the time dimension and M elements along the frequency dimension, using a Symplectic Fast Fourier Transform (SFFT). Note, that the sub-grid may not take all the time-frequency resources and other sub-grids may be also allocated for other delay-Doppler transformations (possibly of different users).

Figure 16C:
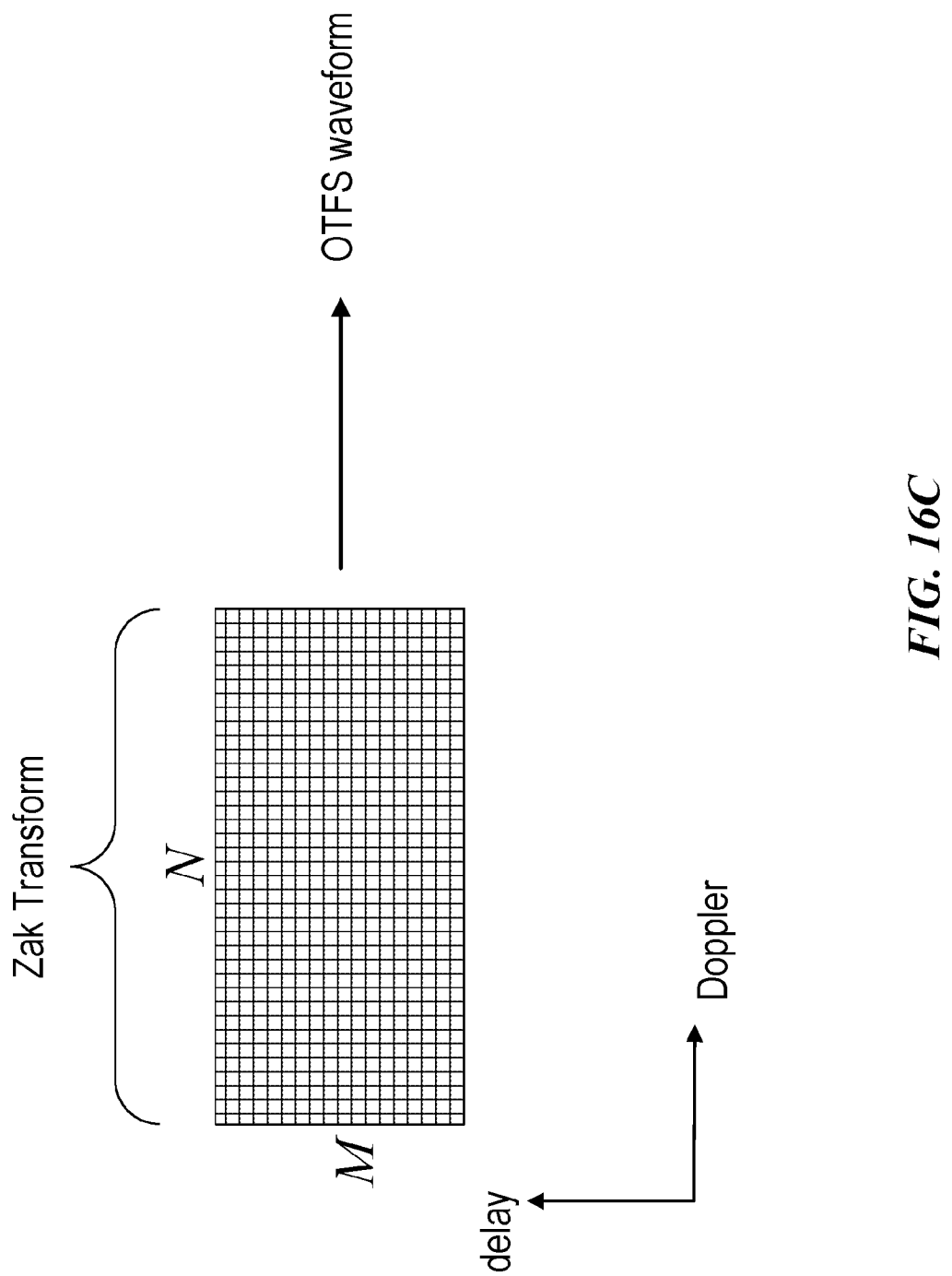
FIG. 16C shows an example of transmission method in which a delay-Doppler grid is transformed to an OTFS waveform using a Zak transform over the Doppler dimension.

FIG. 16C shows an example of transmission method 3, where a delay-Doppler grid is transformed to an OTFS waveform using the Zak transform over the Doppler dimension. The Zak transform is further discussed in Section 9.

6. Examples of Receiver Signal Processing

The received waveform is transformed back to delay-Doppler for further processing. This transformation depends on how the waveform was transmitted:

1. A waveform of transmission method 1, is first transformed to a time-frequency grid using a Fast Fourier Transform (FFT) and then the OTFS section of the grid is extracted and converted to delay-Doppler via the Inverse Symplectic Fast Fourier Transform (ISFFT). An example for this is given in FIG. 16D.
2. A waveform of transmission method 2, is first transformed to a time-frequency grid using a Fast Fourier Transform (FFT) and then the OTFS sub-grid is extracted and converted to delay-Doppler via the Inverse Symplectic Fast Fourier Transform (ISFFT). An example for this is given in FIG. 16E.
3. A waveform of transmission method 3, is transformed directly to delay-Doppler via an inverse Zak transform over the time dimension, as shown in FIG. 16F. Afterwards, a receive two-dimensional pulse may be applied to it.

Figure 16D:
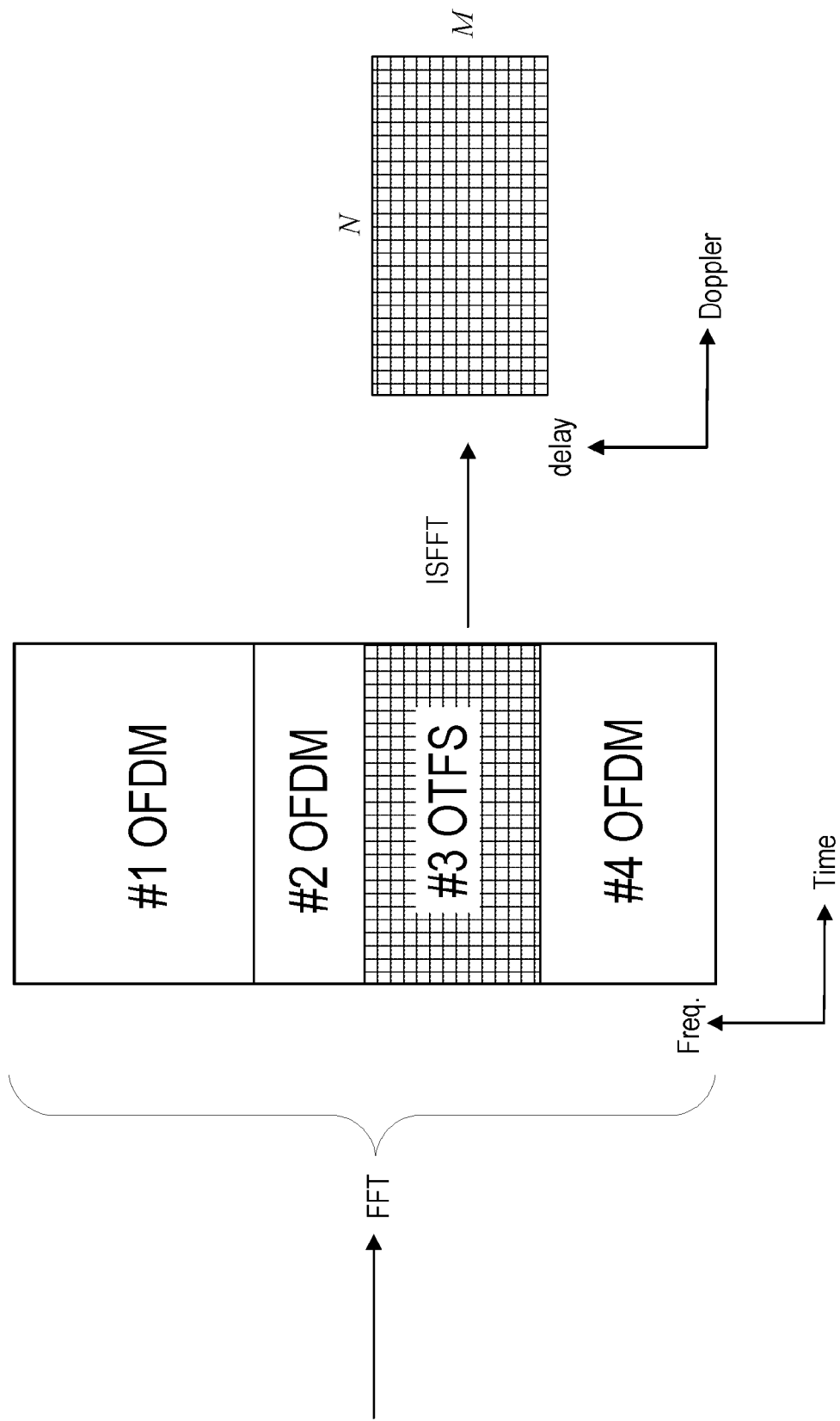
FIG. 16D shows an example of a reception method in which Inverse SFFT (ISFFT) is used to recover information bits from a received waveform.

FIG. 16D depicts a receiver processing example for a waveform generated by transmission method 1. The received waveform is transformed to a time-frequency grid using a Fast Fourier Transform (FFT) and the OTFS part (denoted as "#3 OTFS") is extracted and transformed to delay-Doppler via an Inverse Symplectic Fast Fourier Transform (ISFFT).

Figure 16E:
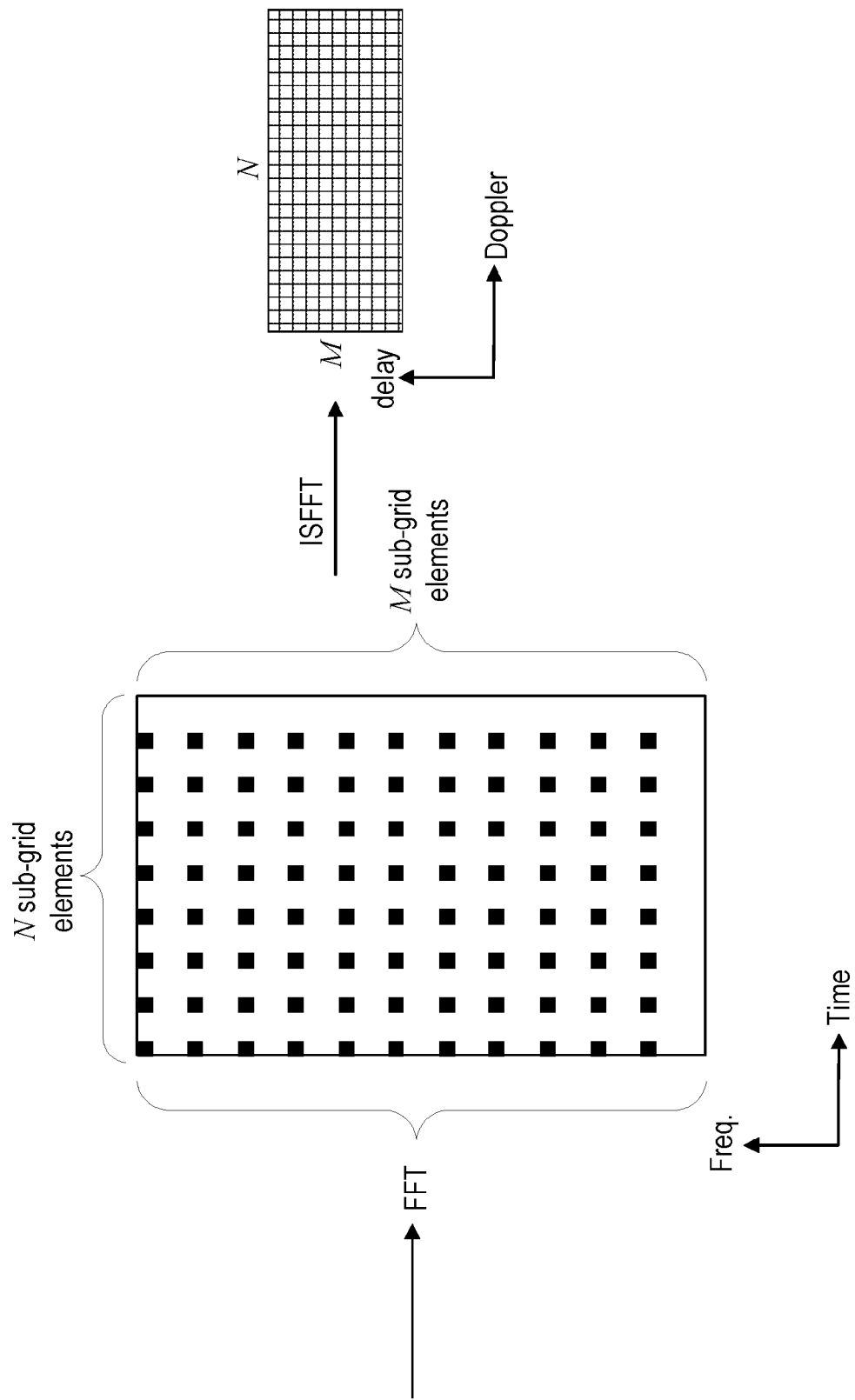
FIG. 16E shows an example of a reception method in which Inverse SFFT (ISFFT) is used to recover information bits from an OTFS sub-grid of a received waveform.
Figure 16F:
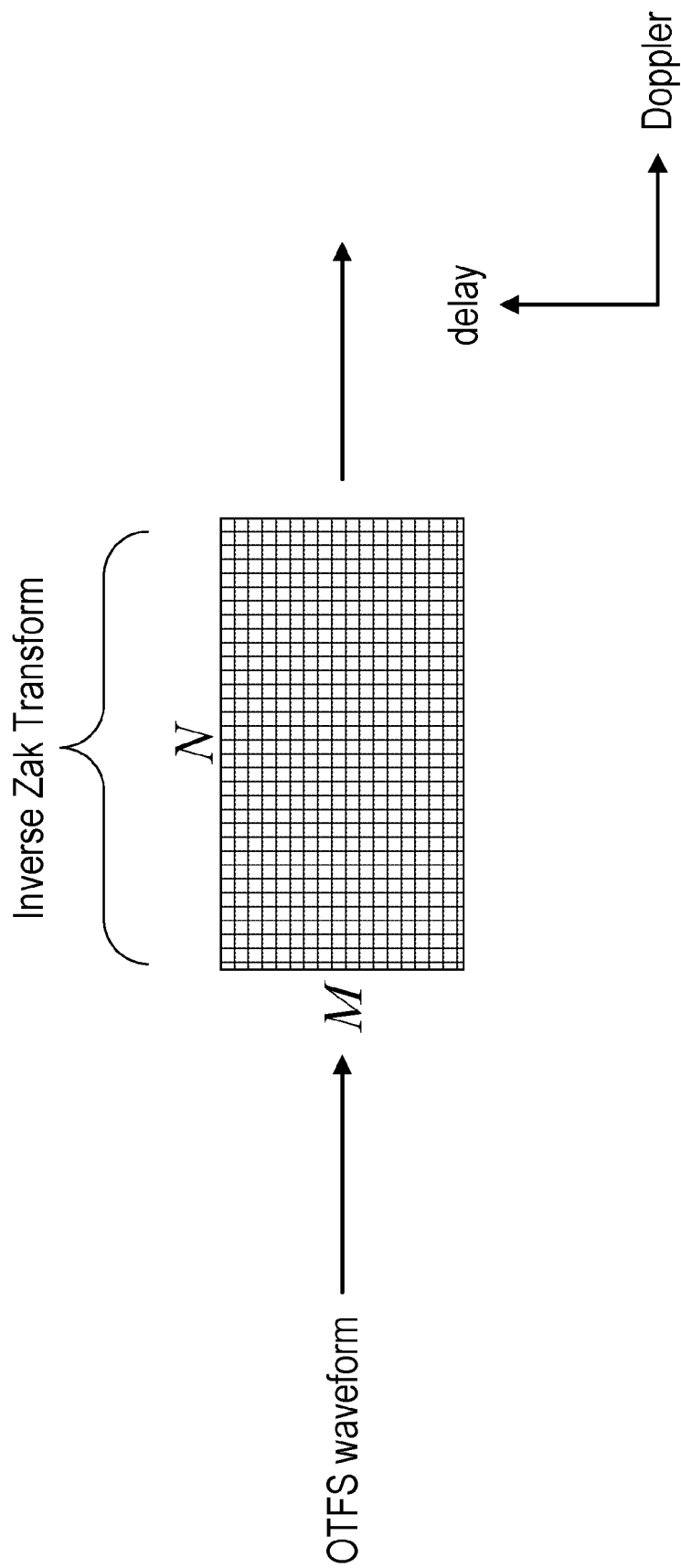
FIG. 16F shows an example of a reception method in which an inverse Zak transform over the time dimension is used to recover information bits from a received waveform.

FIG. 16E depicts a receiver processing example for a waveform generated by transmission method 2. The received waveform is transformed to a time-frequency grid using a Fast Fourier Transform (FFT) and the OTFS sub-grid is extracted and transformed to delay-Doppler via an Inverse Symplectic Fast Fourier Transform (ISFFT).

FIG. 16F depicts a receiver processing example for a waveform generated by transmission method 3. The received OTFS waveform is arranged in a grid N×M elements and transformed to delay-Doppler via the inverse Zak transform over the time dimension. It is noted that in the description of UWB OTFS signal generation and reception as described in the present document, while reference signals are not specifically described, in practical systems, some resources may be allocated to various reference signals for monitoring or calibration of the channel between a transmitter and a receiver.

7. Advantageous Benefits of the UWB Waveform

One operational advantage for the embodiments that use the UWB signal waveform for transmission/reception of information as described herein is that significant processing gain may be achieved over conventional wireless data transmission techniques. For example, spectral energy in any given frequency spectrum may be sufficiently low, allowing for higher link budget for the transmission scheme. In additional, due to the spread spectrum nature of the signal over the wireless medium, some embodiments may be able to benefit from low possibility of interception or jamming, compared to conventional OTFS transmission schemes.

8. Advantageous Benefits of the Filter Bank Approach

As described with reference to, for example, FIGS. 12 and FIGS. 13A-13D, the time domain signal pulse train or sequence underlying the transmitted signal waveform may be shaped through filters of differing (or uniform) bandwidths. One advantageous aspect of such a scheme is that the differing filter bandwidth may be used for shaping pulses along Doppler dimension. The filter through which a particular data of a particular user is processed may be determined during run-time and adjusted based on operational needs. Another advantageous aspect of using filter banks is that the output signal of each filter will typically have a peak to average power ration (PAPR) that is significantly less than the PAPR of the entire signal if it were transmitted using a conventional transmission scheme. In particular, filter bank resolution in the Doppler domain may be used to not only control PAPR, but also used for adjusting Doppler resolution of received signals at a receiver during operation. For example, signals for a transmitter user that is not moving may be processed through a wide filter with low PAPR value. Conversely, a relatively narrower filter may be used in a case that a finer Doppler resolution is desired. The exact transmit/receiver filter bandwidths used for a signal communication between a transmitter and a receiver may be communicated ahead of time and may be adjusted or switched from time to time based on run-time conditions.

As an illustration of the above advantageous aspect, referring back to FIG. 4, a row 404 of a particular Doppler value will typically have signals with same amplitude, which lends itself to low PAPR signals after the mapping into an OTFS waveform is performed. User data may be multiplexed to assign data of one user to a row, thereby benefitting from the low PAPR. Furthermore, the corresponding channel acquisition may be extended over a longer duration (e.g., 10 milliseconds instead of 1 millisecond) to obtain a fine estimate at the specific Doppler shift value.

9. Examples Embodiments of the Zak Transform

Signal transmissions in a wireless network may be represented by describing the waveforms in the time domain, in the frequency domain, or in the delay-Doppler domain (e.g., Zak domain). Because these three represent three different ways of describing the signals, signal in one domain can be converted into signal in the other domain via a transform. For example, a time-Zak transform may be used to convert from Zak domain to time domain. For example, a frequency-Zak transform may be used to convert from the Zak domain to the frequency domain. For example, the Fourier transform (or its inverse) may be used to convert between the time and frequency domains.

In signal processing, it is traditional to represent signals (or waveforms) either in time or in the frequency domain. Each representation reveals different attributes of the signal. The dictionary between these two realizations is the Fourier transform:

$$FT: L_2(t \in \mathbb{R}) \to L_2(f \in \mathbb{R})$$

Interestingly, there is another domain where signals can be naturally realized. This domain is called the delay Doppler domain. For the purpose of the present discussion, this is also referred to as the Zak domain. In its simplest form, a Zak signal is a function $\varphi(\tau, v)$ of two variables. The variable $\tau$ is called delay and the variable $v$ is called Doppler.

The function φ(τ, v) is assumed to be periodic along v with period and $v_r$ quasi-periodic along τ with period $τ_r$. The quasi periodicity condition is given by:

$$\varphi(\tau + n\tau_{r1}v + mv_r) = \exp(j2\pi nv \cdot \tau_r)\varphi(\tau, v),$$

for every n, m∈ $\mathbb{Z}$

Figure 17:
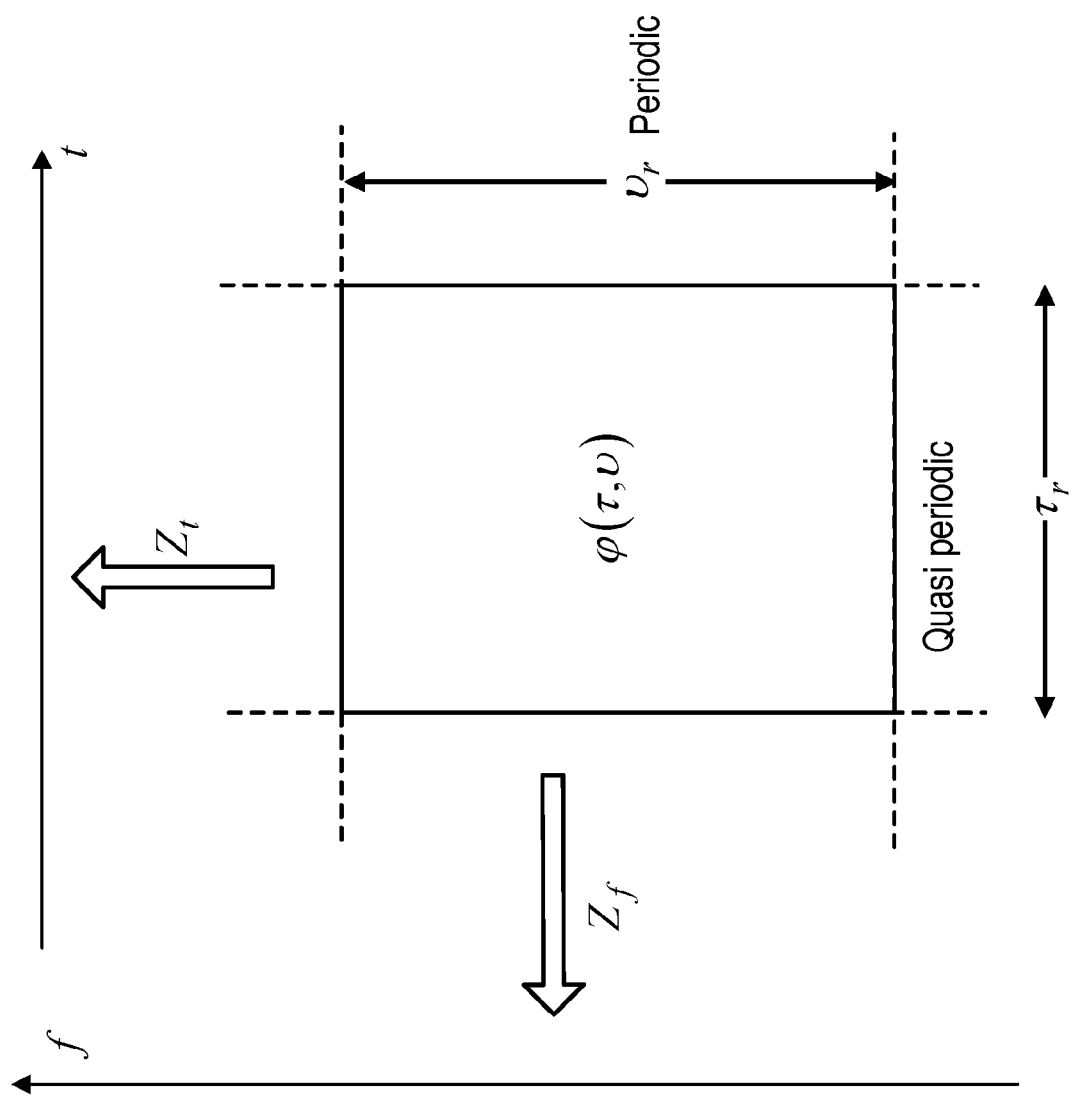
FIG. 17 pictorially depicts relationship between time, frequency and Zak domains.

The periods are assumed to satisfy the Nyquist condition $τ_r \cdot v_r = 1$. Zak domain signals are related to time and frequency domain signals through canonical transforms that are called the time and frequency Zak transforms. The time and frequency Zak transforms are principally geometric projections: the time Zak transform is integration along the Doppler variable and reciprocally the frequency Zak transform is integration along the delay variable. The different signal domains and the transformations connecting between them are depicted in FIG. 17.

Figure 18:
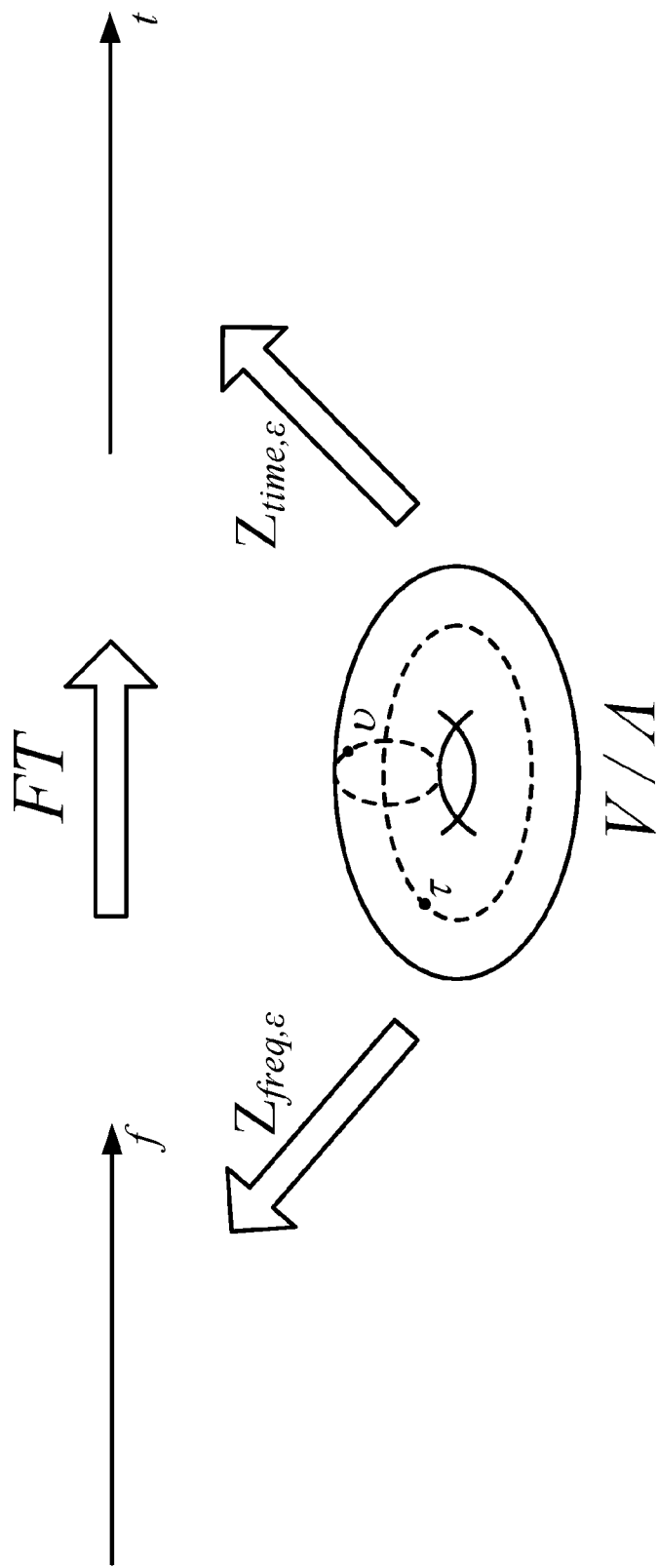
FIG. 18 pictorially depicts an example wherein the Zak domain and time/frequency Zak transforms realizing the signal space realization lie in between time and frequency realizations.

The Zak transform plays for OTFS the same role the Fourier transform plays for OFDM. For example, the time Zak transform is integration along the Doppler dimension (taking the DC component) for every point of time. Reciprocally, the frequency Zak transform is Fourier transform along the delay dimension. In other words, the pair of Zak trans-forms constitute a square root decomposition of the Fourier transform, reinforcing the interpretation of the Zak realization as residing between the time and the frequency realizations (see FIG. 18).

10. Example Embodiments of the Disclosed Technology

Figure 19:
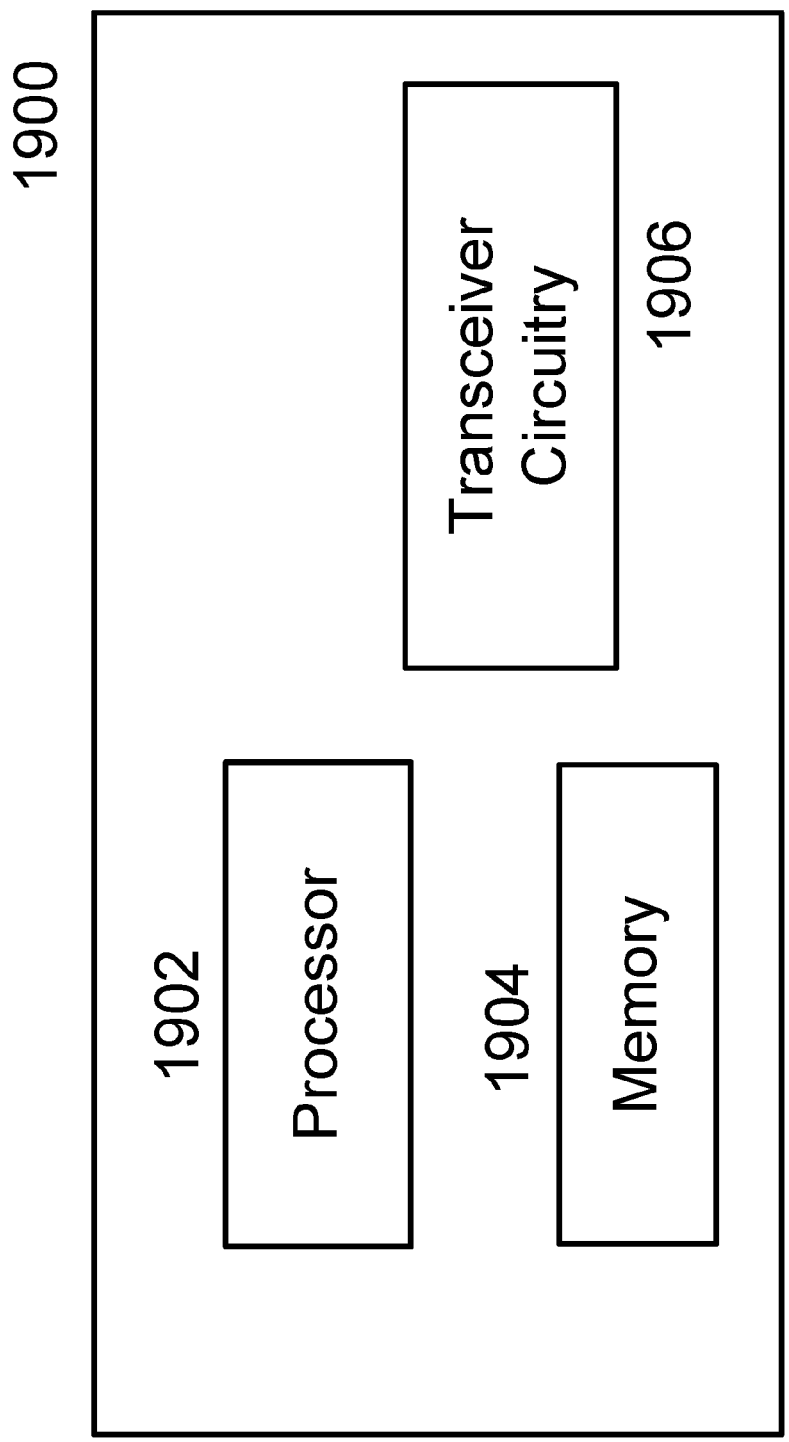
FIG. 19 shows an example of a hardware platform.

FIG. 19 is a block diagram representation of a wireless hardware platform 1900 which may be used to implement the various methods described in the present document. The hardware platform 1900 may be incorporated within a base station or a user device. The hardware platform 1900 includes a processor 1902, a memory 1904 and a transceiver circuitry 1906. The processor may execute instructions, e. g., by reading from the memory 1904, and control the operation of the transceiver circuitry 1906 and the hardware platform 1900 to perform the methods described herein. In some embodiments, the memory 1904 and/or the transceiver circuitry 1906 may be partially or completely contained within the processor 1902 (e.g., same semiconductor package).

The following examples highlight some embodiments that use one or more of the techniques described herein.

The following solutions may be preferably implemented by some transmitter embodiments.

Figure 20:
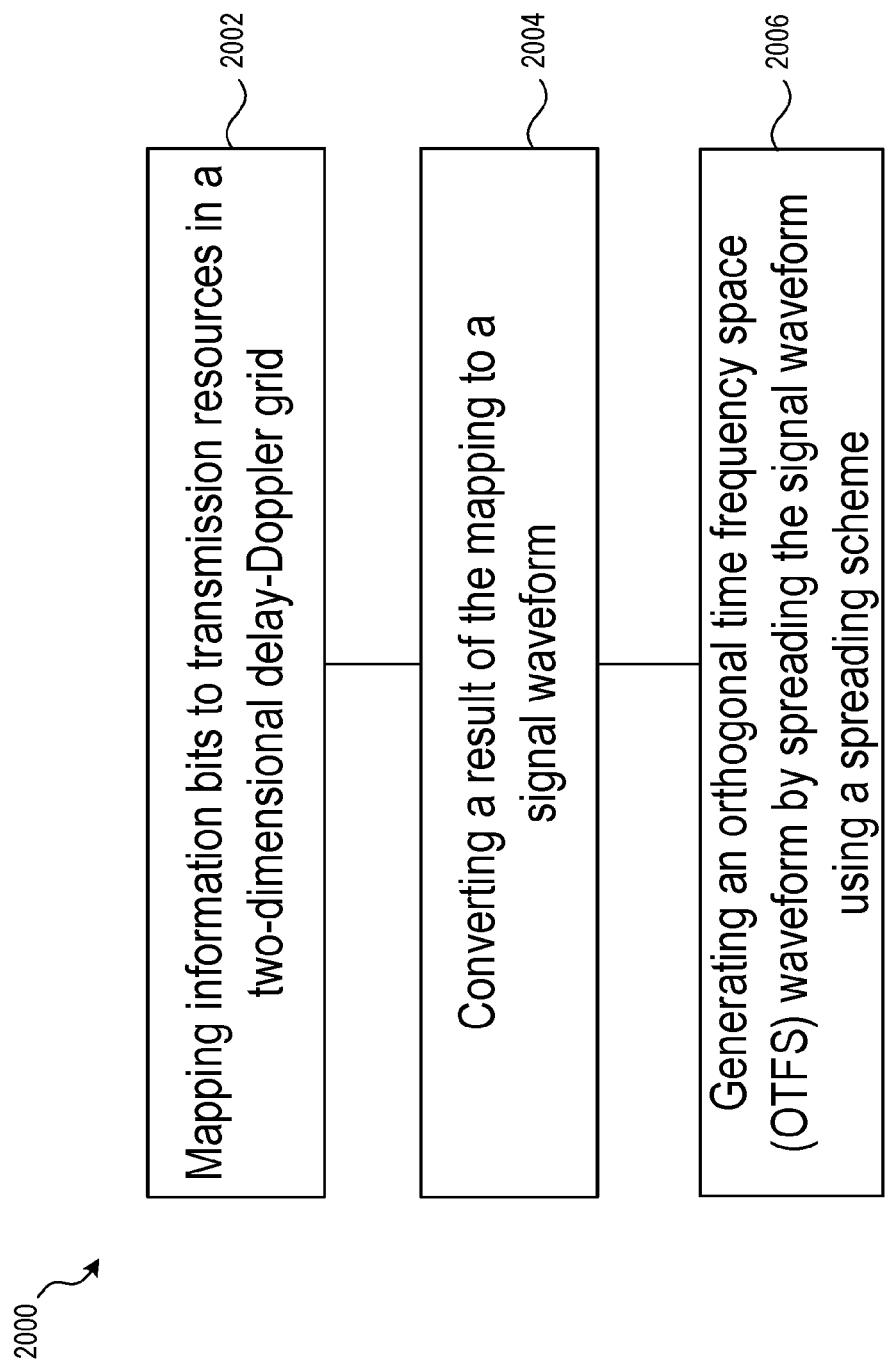
FIGS. 20-21 are flowcharts for various example methods of wireless communication.

1. A method of wireless communication (e.g., method 1900 shown in FIG. 20), comprising: mapping (2002) information bits to transmission resources in a two-dimensional delay-Doppler grid, wherein the two-dimensional delay-Doppler grid comprises N Doppler elements along a Doppler dimension and M delay elements along a delay dimension, where N and M are positive integers; converting (2004) a result of the mapping to a signal waveform; and generating (2006) an orthogonal time frequency space (OTFS) waveform by spreading the signal waveform using a spreading scheme. In some embodiments, the signal waveform may not be explicitly generated and the OTFS waveform may by directly generated without the intermediate step of generating the signal waveform.

2. The method of solution 1, wherein the signal waveform comprises sequences of pulses that are modulated using a complex waveform depending on a coordinate of the Doppler element of a corresponding pulse.

3. The method of any of solutions 1-2, wherein time domain positions of pulses in the sequences of pulses are shifted along time dimension depending on a coordinate of the delay element of the corresponding pulse. Some examples are depicted with respect to FIGS. 2, 15 and 9B.

4. The method of any of solutions 1-3, wherein the OTFS waveform corresponds to an output of exciting a two-dimensional filter in the delay-Doppler domain using the transmission resources. Various examples of two-dimensional filters are described with respect to FIGS. 12 and 13A-13D.

5. The method of any of solutions 1-4, wherein the spreading scheme comprises applying a chirp function to each pulse.

6. The method of any of solutions 1-4, wherein the spreading scheme comprises applying a chaos-based transformation.

7. The method of any of solutions 1-4, wherein the spreading scheme comprises applying a pseudo noise modulation.

8. The method of any of solutions 1-4, wherein the spreading scheme comprises applying frequency hopping.

Additional details related to the spreading schemes in solutions 5-8 are discussed with reference to FIG. 9.

9. The method of any of solutions 1-8, wherein the two-dimensional filter comprises a uniform filter bank.

10. The method of any of solutions 1-8, wherein the two-dimensional filter comprises a non-uniform filter bank.

11. The method of solution 10, wherein the non-uniform filter bank comprises a wavelet filter bank.

Additional details related to the filter banks in solutions 9-11 are discussed with reference to FIGS. 10, 13, 14A-14D and Section 8.

12. The method of any of solutions 1-8, wherein the two-dimensional filter comprises a discrete Fourier transform.

13. The method of any of solutions 1-12, wherein the two-dimensional filter uses filters of differing bandwidth. Additional details are discussed with reference to FIGS. 13, 14A-14D and Sections 7 and 8.

14. The method of any of solutions 1-9, wherein the sequence of pulses is mapped to overlapping frequency bands in the signal waveform. Additional examples are described with respect to FIG. 15.

15. The method of solutions 1-4, wherein the spreading is performed in the time domain and/or the frequency domain.

16. The method of any of solutions 1-4, wherein the mapping the information bits to the two-dimensional delay-Doppler grid comprises multiplexing user data for multiple users and mapping to the delay-Doppler grid.

17. The method of solution 16, wherein the multiplexing is performed along the delay dimension, the Doppler dimension, and/or a spatial dimension.

18. The method of solution 16-17, wherein the multiplexing is performed using code division multiplexing. For example, code division multiplexing access (CDMA) based multiplexing of users may be used in some embodiments.

19. The method of any of solutions 1-18, wherein the converting the result of the mapping to the signal waveform comprises applying a Symplectic Fast Fourier Transform (SFFT).

20. The method of any of solutions 1-18, wherein the converting the result of the mapping to the signal waveform comprises applying a Zak transform over the Doppler dimension. Additional details related to the Zak transform are discussed in Section 9.

The following solutions may be preferably implemented by some receiver embodiments. It is noted that the receiver-side techniques follow a symmetrical receiver-side processing for receiving transmitted signal and accordingly similar technical terms are used in describing these embodiments. Furthermore, while the drawings described in the present document often show transmitter-side signal processing, the corresponding inverse processing will be performed by a receiver of a signal generated by a transmitter according to the disclosed techniques.

Figure 21:
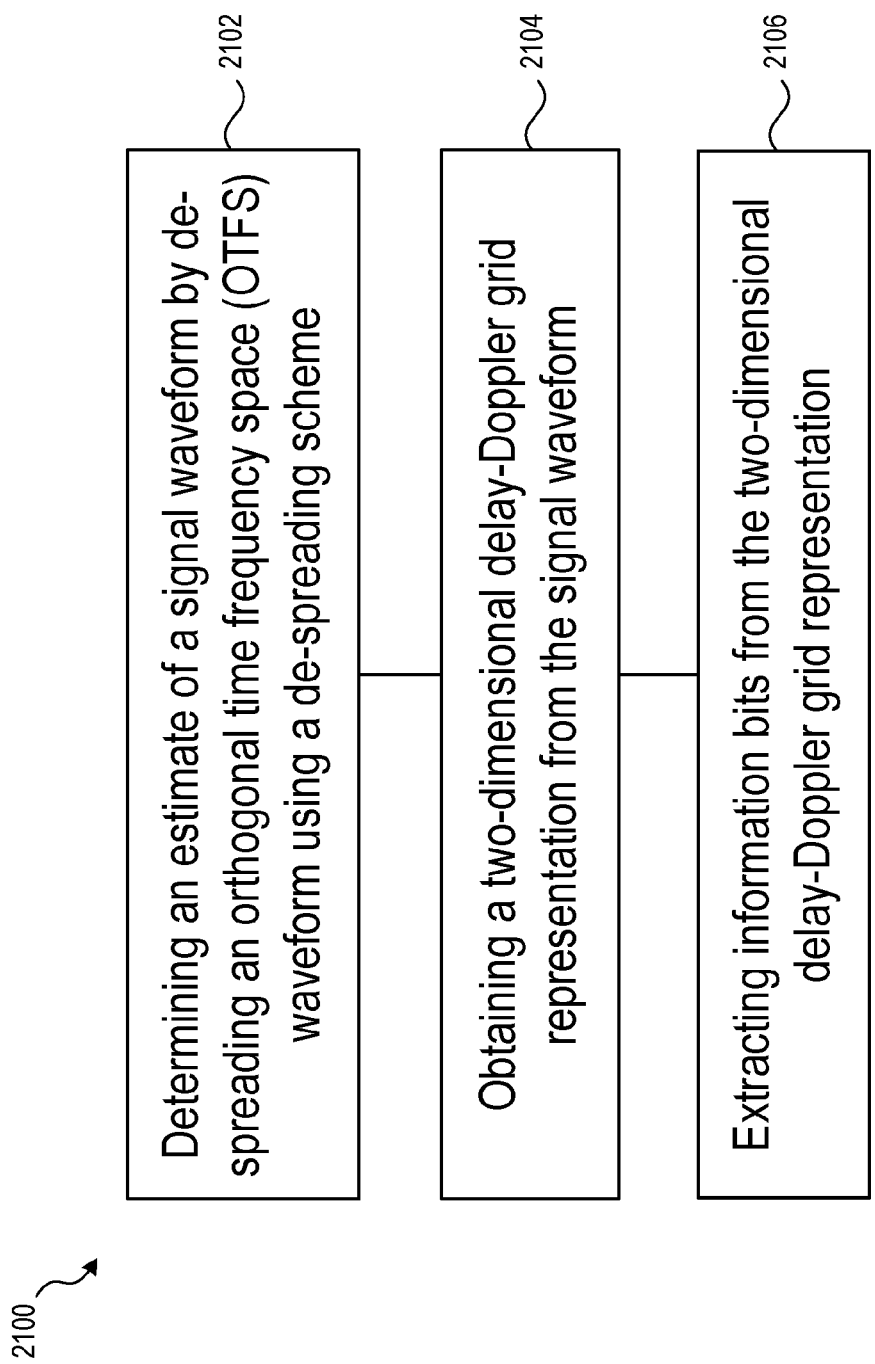

21. A method of wireless communication (e.g., method 2100 depicted in FIG. 21), comprising: determining (2102) an estimate of a signal waveform received at a receiver by de-spreading an orthogonal time frequency space (OTFS) waveform using a de-spreading scheme; obtaining (2104) a two-dimensional delay-Doppler grid representation from the signal waveform; and extracting (2106) information bits from the two-dimensional delay-Doppler grid representation.

22. The method of solution 21, wherein the signal waveform comprises sequences of pulses that are modulated using a complex waveform depending on a coordinate of the Doppler element of a corresponding pulse.

23. The method of any of solutions 21-22, wherein time domain positions of pulses in the sequences of pulses are shifted along time dimension depending on a coordinate of the delay element of a corresponding pulse.

24. The method of any of solutions 21-23, wherein the OTFS waveform corresponds to an output of exciting a two-dimensional filter in the delay-Doppler domain using the transmission resources.

25. The method of any of solutions 21-24, wherein the de-spreading scheme comprises applying an inverse chirp function to the received signal waveform.

26. The method of any of solutions 21-24, wherein the de-spreading scheme comprises applying an inverse chaos-based transformation to the received signal waveform.

27. The method of any of solutions 21-24, wherein the de-spreading scheme comprises applying a pseudo noise demodulation to the received signal waveform.

28. The method of any of solutions 21-24, wherein the de-spreading scheme comprises applying an inverse frequency hopping to the received signal waveform.

29. The method of any of solutions 21-28, wherein the two-dimensional filter comprises a uniform filter bank.

30. The method of any of solutions 21-28, wherein the two-dimensional filter comprises a non-uniform filter bank.

31. The method of solution 30, wherein the non-uniform filter bank comprises a wavelet filter bank.

32. The method of any of solutions 21-28, wherein the two-dimensional filter comprises an inverse discrete Fourier transform.

33. The method of any of solutions 21-32, wherein the two-dimensional filter uses filters of differing bandwidth.

34. The method of any of solutions 21-29, wherein the sequence of pulses is mapped to overlapping frequency bands in the signal waveform.

35. The method of solutions 21-24, wherein the de-spreading is performed in the time domain and/or the frequency domain.

36. The method of any of solutions 21-24, wherein the de-mapping the information bits from the two-dimensional delay-Doppler grid comprises demultiplexing user data from multiplexed data for multiple users and demapping from the delay-Doppler grid.

37. The method of solution 35, wherein the demultiplexing is performed along the delay dimension, the Doppler dimension, and/or a spatial dimension.

38. The method of solution 35-36, wherein the demultiplexing is performed using code division demultiplexing.

39. The method of any of solutions 21-38, wherein the converting the result of the demapping to the estimate of the signal waveform comprises applying an inverse Symplectic Fast Fourier Transform (SFFT).

40. The method of any of solutions 21-38, wherein the converting the result of the demapping to the estimate of the signal waveform comprises applying an inverse Zak transform over the Doppler dimension.

41. The method of any of above solutions, wherein the signal waveform comprises an ultra-wide band (UWB) signal.

42. A wireless communication apparatus comprising a processor and a transceiver, wherein the processor is configured to perform a method recited in any one or more of above solutions.

43. A system comprising a plurality of wireless communication apparatus, each apparatus comprising one or more processors, configured to implement a method recited in any one or more of above solutions.

44. A technique, method or apparatus disclosed in the present document.

In the solutions provided in the present document, information bits may include user data, control data or other network traffic that is communicated between a transmitting device and a receiver device. The various embodiments have been described with M=512 and N=16, but other values of N and M are possible in implementations.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of wireless communication, comprising:
    mapping information bits to transmission resources in a two-dimensional delay-Doppler grid, wherein the two-dimensional delay-Doppler grid comprises N Doppler elements and M delay elements, where N and M are positive integers;
    converting a result of the mapping to an orthogonal time frequency space (OTFS) waveform comprising sequences of pulses;
    mapping the sequences of pulses to predetermined frequency bands and summing frequency-mapped signals to generate a resulting signal; and
    generating an ultra-wideband (UWB) signal by spreading the resulting signal over a bandwidth greater than 200 MHz using a spreading scheme.

2. The method of claim 1, wherein the sequences of pulses are modulated using a complex waveform depending on a coordinate of a Doppler element of a corresponding pulse.

3. The method of claim 2, wherein time-domain positions of pulses in the sequences of pulses are shifted along a time dimension depending on a coordinate of a delay element of the corresponding pulse.

4. The method of claim 2, wherein the sequences of pulses are mapped to overlapping frequency bands in the OTFS waveform.

5. The method of claim 1, wherein the OTFS waveform corresponds to an output of exciting a two-dimensional filter in a delay-Doppler domain using the transmission resources.

6. The method of claim 1, wherein the spreading scheme comprises applying a chirp spread spectrum scheme, applying a chaos-based transformation, applying a pseudo noise modulation, or applying frequency hopping.

7. The method of claim 1, wherein the mapping the information bits to the two-dimensional delay-Doppler grid comprises multiplexing user data for multiple users and mapping to the two-dimensional delay-Doppler grid.

8. The method of claim 7, wherein the multiplexing is performed along a delay dimension, a Doppler dimension, or a spatial dimension.

9. The method of claim 7, wherein the multiplexing is performed using code division multiplexing.

10. The method of claim 1, wherein the converting the result of the mapping to the OTFS waveform comprises applying a Symplectic Fast Fourier Transform (SFFT).

11. The method of claim 1, wherein the converting the result of the mapping to the OTFS waveform comprises applying a Zak transform over a Doppler dimension.

12. An apparatus for wireless communication, comprising: a processor configured to implement a method comprising:
    mapping information bits to transmission resources in a two-dimensional delay-Doppler grid, wherein the two-dimensional delay-Doppler grid comprises N Doppler elements and M delay elements, where N and M are positive integers;
    converting a result of the mapping to an orthogonal time frequency space (OTFS) waveform comprising sequences of pulses;
    mapping the sequences of pulses to predetermined frequency bands and summing frequency-mapped signals to generate a resulting signal; and
    generating an ultra-wideband (UWB) signal by spreading the resulting signal over a bandwidth greater than 200 MHz using a spreading scheme.

13. The apparatus of claim 12, wherein the sequences of pulses are modulated using a complex waveform depending on a coordinate of a Doppler element of a corresponding pulse.

14. The apparatus of claim 13, wherein time-domain positions of pulses in the sequences of pulses are shifted along a time dimension depending on a coordinate of a delay element of the corresponding pulse.

15. The apparatus of claim 13, wherein the sequences of pulses are mapped to overlapping frequency bands in the OTFS waveform.

16. The apparatus of claim 12, wherein the OTFS waveform corresponds to an output of exciting a two-dimensional filter in a delay-Doppler domain using the transmission resources.

17. The apparatus of claim 12, wherein the spreading scheme comprises applying a chirp spread spectrum scheme, applying a chaos-based transformation, applying a pseudo noise modulation, or applying frequency hopping.

18. The apparatus of claim 12, wherein the mapping the information bits to the two-dimensional delay-Doppler grid comprises multiplexing user data for multiple users and mapping to the two-dimensional delay-Doppler grid.

19. The apparatus of claim 18, wherein the multiplexing is performed along a delay dimension, a Doppler dimension, or a spatial dimension.

20. The apparatus of claim 18, wherein the multiplexing is performed using code division multiplexing.

21. The apparatus of claim 12, wherein the converting the result of the mapping to the OTFS waveform comprises applying a Symplectic Fast Fourier Transform (SFFT).

\* \* \* \* \*